US010296104B2

(12) United States Patent
Sendai et al.

(10) Patent No.: US 10,296,104 B2
(45) Date of Patent: May 21, 2019

(54) DISPLAY DEVICE, METHOD OF CONTROLLING DISPLAY DEVICE, AND PROGRAM

(71) Applicant: SEIKO EPSON CORPORATION, Tokyo (JP)

(72) Inventors: Kaori Sendai, Okaya (JP); Kazuo Nishizawa, Matsumoto (JP); Fusashi Kimura, Matsumoto (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 146 days.

(21) Appl. No.: 15/424,110

(22) Filed: Feb. 3, 2017

(65) Prior Publication Data

US 2017/0235380 A1    Aug. 17, 2017

(30) Foreign Application Priority Data

Feb. 16, 2016  (JP) .................................. 2016-026989
Feb. 16, 2016  (JP) .................................. 2016-026990

(51) Int. Cl.
| | |
|---|---|
| *G06F 1/16* | (2006.01) |
| *G02B 27/01* | (2006.01) |
| *G06F 3/0346* | (2013.01) |
| *G06F 3/0487* | (2013.01) |
| *G06F 3/0485* | (2013.01) |

(52) U.S. Cl.
CPC ......... *G06F 3/0346* (2013.01); *G02B 27/017* (2013.01); *G06F 1/163* (2013.01); *G06F 3/0485* (2013.01); *G06F 3/0487* (2013.01); *G02B 2027/014* (2013.01); *G02B 2027/0178* (2013.01); *G02B 2027/0187* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 2005/0034084 A1* | 2/2005 | Ohtsuki | G06T 15/04 715/864 |
| 2007/0035518 A1 | 2/2007 | Francz et al. | |
| 2010/0271400 A1* | 10/2010 | Suzuki | G06F 3/017 345/660 |
| 2012/0154449 A1* | 6/2012 | Ramagem | G06F 3/0346 345/684 |
| 2013/0127715 A1* | 5/2013 | Simpkins | G06F 3/0304 345/158 |
| 2015/0234189 A1* | 8/2015 | Lyons | G02B 27/0172 345/174 |

FOREIGN PATENT DOCUMENTS

JP    2009-500923 A    1/2009

* cited by examiner

*Primary Examiner* — Nicholas J Lee
(74) *Attorney, Agent, or Firm* — Oliff PLC

(57) ABSTRACT

An HMD includes an image display unit that makes a user visually perceive an image, and an control device, capable of being moved independently of the image display unit, which includes a six-axis sensor detecting a movement and a track pad receiving an operation. The HMD controls the display of the image display unit in accordance with the movement detected by the six-axis sensor in a state where the track pad receives an operation.

20 Claims, 13 Drawing Sheets

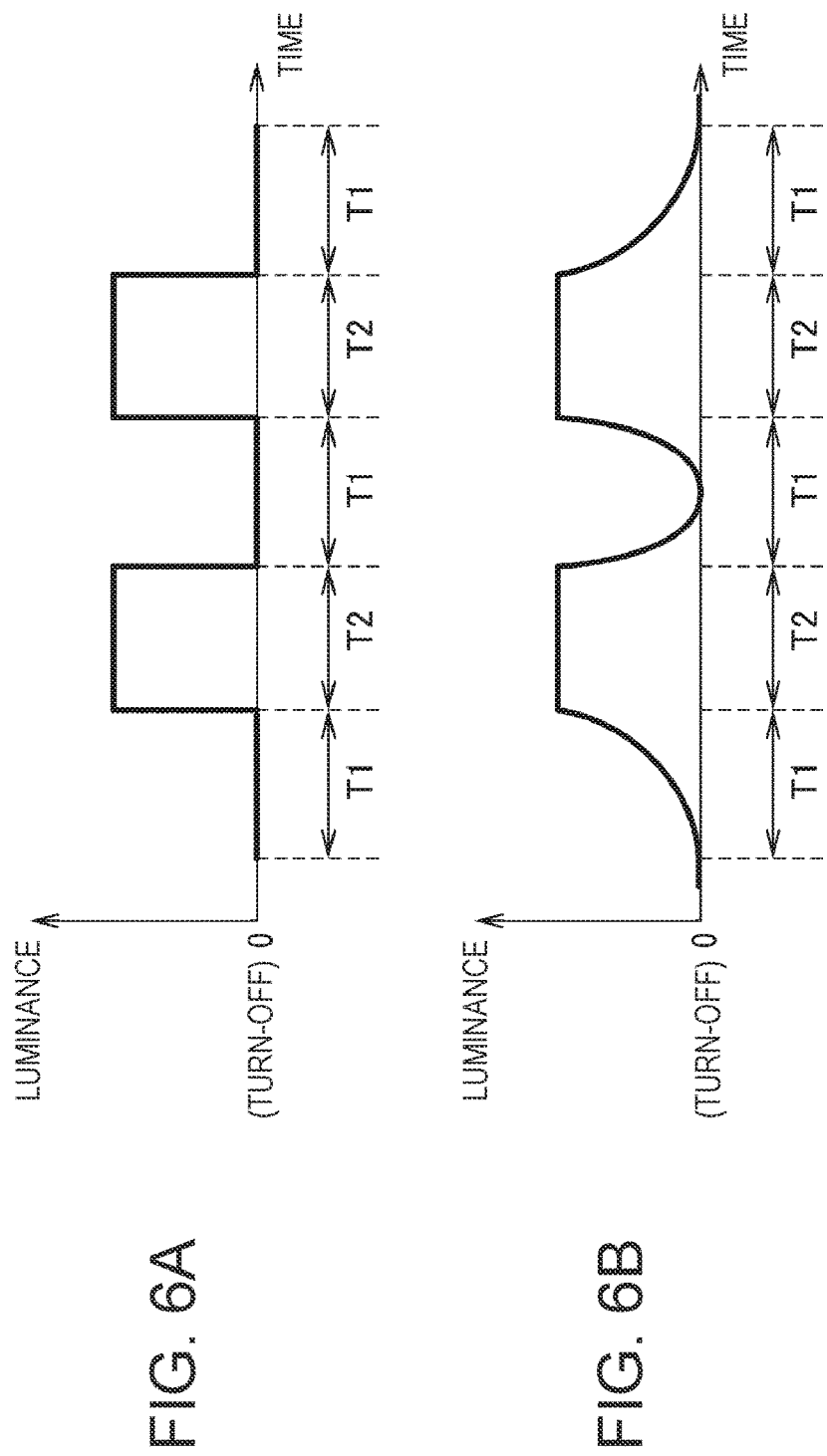

DISPLAY DEVICE, METHOD OF CONTROLLING DISPLAY DEVICE, AND PROGRAM

BACKGROUND

1. Technical Field

The present invention relates to a display device, a method of controlling the display device, and a program.

2. Related Art

Hitherto, there has been known an example in which an operation is performed on a display device using a device which is used by being held in a user's hand (for example, see JP-T-2009-500923). A remote control device disclosed in JP-T-2009-500923 includes a ring-shaped housing or body and is operated by being gripped by a user, and the movement of the remote control device is reflected on display.

In a configuration disclosed in JP-T-2009-500923, the operation of the remote control device is reflected on display. In this manner, in a configuration in which display is controlled in response to a movement, there is an advantage in that operability is excellent because of a simple operation. However, the display changes in response to a movement, regardless of a user's intention. For this reason, there is the possibility that a user's unintended change in display occurs.

SUMMARY

An advantage of some aspects of the invention is to provide a display device capable of easily changing display in response to an operation and suppressing a user's unintended change in display, a method of controlling the display device, and a program.

A head-mounted display device according to an aspect of the invention includes a display unit that makes a user visually perceive an image, the head-mounted display device including an operation device, capable of being moved independently of the display unit, which includes a movement detection unit detecting a movement of the operation device and an operation reception unit receiving an operation different from the detection of the movement detection unit, and a control unit that controls display of the display unit in accordance with the movement detected by the movement detection unit in a state where the operation reception unit receives an operation.

According to the aspect of the invention, it is possible to easily control the display of the display unit in accordance with an operation of moving the operation device. In addition, it is possible to prevent a user's unintended change in display according to the operation state of the operation reception unit.

In the display device of the aspect of the invention, the operation reception unit may receive at least any one of a pressing operation and a contact operation.

According to the aspect of the invention with this configuration, it is possible to move the operation device and to increase operability in a case where the operation reception unit is operated. In addition, operability in a case where the operation reception unit is operated without being visually perceived is excellent, and thus it is possible to easily and reliably operate the operation reception unit even when a user wearing the head-mounted display device hardly visually perceive the operation device.

In the display device of the aspect of the invention, the control unit may change a display magnification of an image displayed on the display unit in a case where a movement corresponding to an operation of rotating the operation device is detected by the movement detection unit.

According to the aspect of the invention with this configuration, it is possible to change a display magnification in accordance with an instinctive operation.

In the display device of the aspect of the invention, the control unit may change an image displayed on the display unit in a direction which is set in advance, in a case where a movement corresponding to an operation of lifting down the operation device or an operation of lifting up the operation device is detected by the movement detection unit.

According to the aspect of the invention with this configuration, it is possible to change an image displayed on the display unit in accordance with an instinctive operation.

In the display device of the aspect of the invention, the control unit may change display of the display unit in a state where the operation reception unit receives an operation, and then fixedly sets a change in the display of the display unit in a case where the operation is canceled.

According to the aspect of the invention with this configuration, it is possible to perform an operation of fixedly setting a change in the display of the display unit. For this reason, it is possible to increase the degree of freedom of a change in display and to achieve an improvement in operability.

In the display device of the aspect of the invention, the control unit may have a predetermined function set therein which is performed in a case where the operation reception unit receives an operation, and may perform a normal mode in which the predetermined function is performed in a case where the operation reception unit receives an operation and a display operation mode in which the display of the display unit is controlled in accordance with the movement detected by the movement detection unit in a state where the operation reception unit receives an operation, in a changeover manner.

According to the aspect of the invention with this configuration, it is possible to use the operation reception unit as an operation unit that indicates a predetermined function.

In the display device of the aspect of the invention, the control unit may perform the display operation mode in a case where the operation reception unit receives an operation within a set time after the movement detection unit detects start of a movement.

According to the aspect of the invention with this configuration, it is possible to easily select whether to perform the normal mode or to perform the display operation mode in accordance with the operation of the operation reception unit.

In the display device of the aspect of the invention, in a case where the control unit starts performing the display operation mode, the control unit may reflect a detection history detected by the movement detection unit during a period between when the movement detection unit detects start of a movement and when the operation reception unit receives an operation, to thereby control display of the display unit.

According to the aspect of the invention with this configuration, the movement of the operation device until the start of the display operation mode can be reflected on the control of display.

In the display device of the aspect of the invention, the operation device may include a position indication operation unit that receives a position indication operation.

According to the aspect of the invention with this configuration, it is possible to perform the position indication operation using the operation device.

In the display device of the aspect of the invention, the control unit may change display of the display unit on the basis of a display position corresponding to a position which is indicated by a position indication operation received by the position indication operation unit in a state where the position indication operation is received by the position indication operation unit and the operation reception unit receives an operation.

According to the aspect of the invention with this configuration, it is possible to control the display of the display unit with a high level of freedom by using the position indication operation and the movement of the operation device. In addition, it is possible to perform complicated display control by a simple operation and to achieve an improvement in operability.

In the display device of the aspect of the invention, the control unit may display an image displayed on the display unit in an enlarged or reduced manner, centering on the display position corresponding to the position which is indicated by the position indication operation received by the position indication operation unit.

According to the aspect of the invention with this configuration, it is possible to realize control of enlarging or reducing display centering on a user's desired position by a simple operation using the operation device.

In the display device of the aspect of the invention, the position indication operation unit may function as the operation reception unit.

According to the aspect of the invention with this configuration, operability in a case where the operation device is operated without being visually perceived is excellent because of a small number of objects to be operated, and thus it is possible to easily and reliably operate the operation device even when a user wearing the head-mounted display device hardly visually perceives the operation device. In addition, this is advantageous in a case where the operation device is made small.

The display device of the invention may further include a display unit movement detection unit that detects a movement of the display unit, wherein the control unit may specify an indication position of an operation received by the position indication operation unit at a timing when the display unit movement detection unit detects a predetermined movement.

According to the aspect of the invention with this configuration, an operation of fixedly setting an indication position during a position indication operation can be performed by the movement of the display unit. For this reason, it is possible to further improve operability in a case where a user wearing the head-mounted display device operates the operation device.

In the display device of the aspect of the invention, the control unit may be capable of performing a first control of controlling display of the display unit in accordance with a type of operation corresponding to a movement detected by the movement detection unit in a state where the operation reception unit receives an operation, a second control of changing display of the display unit on the basis of a display position corresponding to a position which is indicated by a position indication operation received by the position indication operation unit, and a third control of changing display of the display unit in response to a direction of the movement detected by the movement detection unit, in a changeover manner.

According to the aspect of the invention with this configuration, it is possible to change the display of the display unit in accordance with three controls, in response to the movement of the operation device.

In the display device of the aspect of the invention, the control unit may perform control of moving an image displayed on the display unit in a first display operation direction and a second display operation direction paired with the first display operation direction. The first display operation direction may be associated with a first movement direction detected by the movement detection unit, and the second display operation direction may be associated with a second movement direction detected by the movement detection unit.

According to the aspect of the invention with this configuration, it is possible to move an image displayed on the display unit by moving the operation device and to indicate a direction of movement of the image in accordance with a movement direction of the operation device.

In the display device of the aspect of the invention, the control unit may start moving an image in the first display operation direction in response to a movement in the first movement direction detected by the movement detection unit, and then may stop moving the image in the first display operation direction in a case where a movement in the second movement direction is detected by the movement detection unit.

According to the aspect of the invention with this configuration, it is possible to move the image displayed on the display unit to a desired position by combining the movements of the operation device in the two directions.

In the display device of the aspect of the invention, the control unit may start moving an image in the first display operation direction or the second display operation direction in response to a movement detected by the movement detection unit, and then may stop moving the image displayed on the display unit in a case where the operation received by the operation reception unit is canceled.

According to the aspect of the invention with this configuration, it is possible to move the image displayed on the display unit to a desired position by combining the movement of the operation device and an operation of the operation reception unit.

In the display device of the aspect of the invention, the operation device may be a wearable device which is worn on the user's body.

According to the aspect of the invention with this configuration, it is possible to easily control the display of the display unit in accordance with an operation of moving a user's body. In addition, a user's unintended change in display can be prevented by the operation state of the operation reception unit, and thus it is possible to more instinctively perform an operation of controlling display.

A head-mounted display device according to another aspect of the invention includes a display unit that makes a user visually perceive an image, the head-mounted display device including an operation device, capable of being moved independently of the display unit, which includes a movement detection unit detecting a movement of the operation device, and a control unit that controls display of the display unit in accordance with the movement detected by the movement detection unit, wherein the control unit performs a first display change corresponding to a movement in a first movement direction which is detected by the movement detection unit and a second display change corresponding to a movement in a second movement direction which is detected by the movement detection unit, as a process performed on an image displayed on the display unit, and wherein the control unit starts the first display change in a case where the movement in the first movement direction is detected, and then stops the first display change in a case where the movement in the second movement direction is detected by the movement detection unit.

According to the aspect of the invention, it is possible to easily control the display of the display unit in accordance with an operation of moving the operation device. In addition, it is possible to move the image displayed on the display unit to a desired position by combining the movements of the operation device in the two directions.

In the display device of the aspect of the invention, the control unit may perform the first display change in a case where the movement in the first movement direction is detected by the movement detection unit, and may perform the second display change in a case where the movement in the second movement direction is detected by the movement detection unit.

According to the aspect of the invention with this configuration, it is possible to move an image displayed on the display unit by moving the operation device and to indicate a direction of movement of the image in accordance with a movement direction of the operation device.

In the display device of the aspect of the invention, the operation device may include an operation reception unit that receives an operation, and the control unit may change display of the display unit in accordance with the movement detected by the movement detection unit in a state where the operation reception unit receives an operation.

According to the aspect of the invention with this configuration, it is possible to prevent a user's unintended change in display according to the operation state of the operation reception unit.

In the display device of the aspect of the invention, the control unit may perform the first display change in a case where the movement in the first movement direction is detected by the movement detection unit in a state where the operation reception unit receives an operation.

According to the aspect of the invention with this configuration, it is possible to prevent a user's unintended change in display according to the operation state of the operation reception unit.

In the display device of the aspect of the invention, the control unit may start the first display change in a case where the movement in the first movement direction is detected by the movement detection unit, and then may stop the first display change in a case where the operation reception unit does not receive an operation.

According to the aspect of the invention with this configuration, it is possible to prevent a user's unintended change in display according to the operation state of the operation reception unit.

In the display device of the aspect of the invention, the control unit may perform the second display change in a case where the movement in the second movement direction is detected by the movement detection unit in a state where the operation reception unit receives an operation.

According to the aspect of the invention with this configuration, it is possible to move an image displayed on the display unit by moving the operation device and to indicate a direction of movement of the image in accordance with a movement direction of the operation device.

In the display device of the aspect of the invention, the operation reception unit may receive an operation different from the detection of the movement detection unit.

According to the aspect of the invention with this configuration, it is possible to select a state in which display is controlled by the movement of the operation device and a state where display is not controlled, in accordance with an operation which is different from the movement detected by the movement detection unit, and thus it is possible to more reliably prevent a user's unintended change in display.

In the display device of the aspect of the invention, the operation device may be a wearable device which is worn on the user's body.

According to the aspect of the invention with this configuration, it is possible to easily control the display of the display unit in accordance with an operation of moving a user's body. In addition, a user's unintended change in display can be prevented by the operation state of the operation reception unit, and thus it is possible to more instinctively perform an operation of controlling display.

A method of controlling a display device according to still another aspect of the invention is a method of controlling a display device including a display unit that makes a user visually perceive an image and an operation device, capable of being moved independently of the display unit, which includes a movement detection unit detecting a movement of the operation device and an operation reception unit receiving an operation, the method including controlling display of the display unit in accordance with the movement detected by the movement detection unit in a state where the operation reception unit receives an operation.

According to the aspect of the invention, it is possible to easily control the display of the display unit in accordance with an operation of moving the operation device. In addition, it is possible to prevent a user's unintended change in display according to the operation state of the operation reception unit.

A method of controlling a display device according to yet another aspect of the invention is a method of controlling a display device including a display unit that makes a user visually perceive an image and an operation device, capable of being moved independently of the display unit, which includes a movement detection unit detecting a movement of the operation device, the method including performing a first display change corresponding to a movement in a first movement direction which is detected by the movement detection unit and a second display change corresponding to a movement in a second movement direction which is detected by the movement detection unit, as a process performed on an image displayed on the display unit, and starting the first display change in a case where the movement in the first movement direction is detected, and then stopping the first display change in a case where the movement in the second movement direction is detected by the movement detection unit.

According to the aspect of the invention, it is possible to easily control the display of the display unit in accordance with an operation of moving the operation device. In addition, it is possible to move the image displayed on the display unit to a desired position by combining the movements of the operation device in the two directions.

A program according to still yet another aspect of the invention is executable by a computer that controls a display device including a display unit that makes a user visually perceive an image and an operation device, capable of being moved independently of the display unit, which includes a movement detection unit detecting a movement of the operation device and an operation reception unit receiving an operation, and the program causes the computer to perform a function of controlling display of the display unit in accordance with the movement detected by the movement detection unit in a state where the operation reception unit receives an operation.

According to the aspect of the invention, it is possible to easily control the display of the display unit in accordance with an operation of moving the operation device. In addition, it is possible to prevent a user's unintended change in display according to the operation state of the operation reception unit.

A program according to further another aspect of the invention is executable by a computer that controls a display device including a display unit that makes a user visually perceive an image and an operation device, capable of being moved independently of the display unit, which includes a movement detection unit detecting a movement of the operation device, and the program causes the computer to perform functions of performing a first display change corresponding to a movement in a first movement direction which is detected by the movement detection unit and a second display change corresponding to a movement in a second movement direction which is detected by the movement detection unit, as a process performed on an image displayed on the display unit, and starting the first display change in a case where the movement in the first movement direction is detected, and then stopping the first display change in a case where the movement in the second movement direction is detected by the movement detection unit.

According to the aspect of the invention, it is possible to easily control the display of the display unit in accordance with an operation of moving the operation device. In addition, it is possible to move the image displayed on the display unit to a desired position by combining the movements of the operation device in the two directions.

The invention can also be implemented in various aspects other than the display device, the method of controlling a display device, and the program which are described above. For example, the invention can be implemented in an aspect such as a recording medium having the above-mentioned program recorded thereon, a server device that distributes a program, a transmission medium that transmits the program, or a data signal that realizes the program within a carrier wave.

BRIEF DESCRIPTION OF THE DRAWINGS

The invention will be described with reference to the accompanying drawings, wherein like numbers reference like elements.

FIGS. 6A and 6B are diagrams showing a state of lighting of an LED display unit.

DESCRIPTION OF EXEMPLARY EMBODIMENTS

Figure 1:
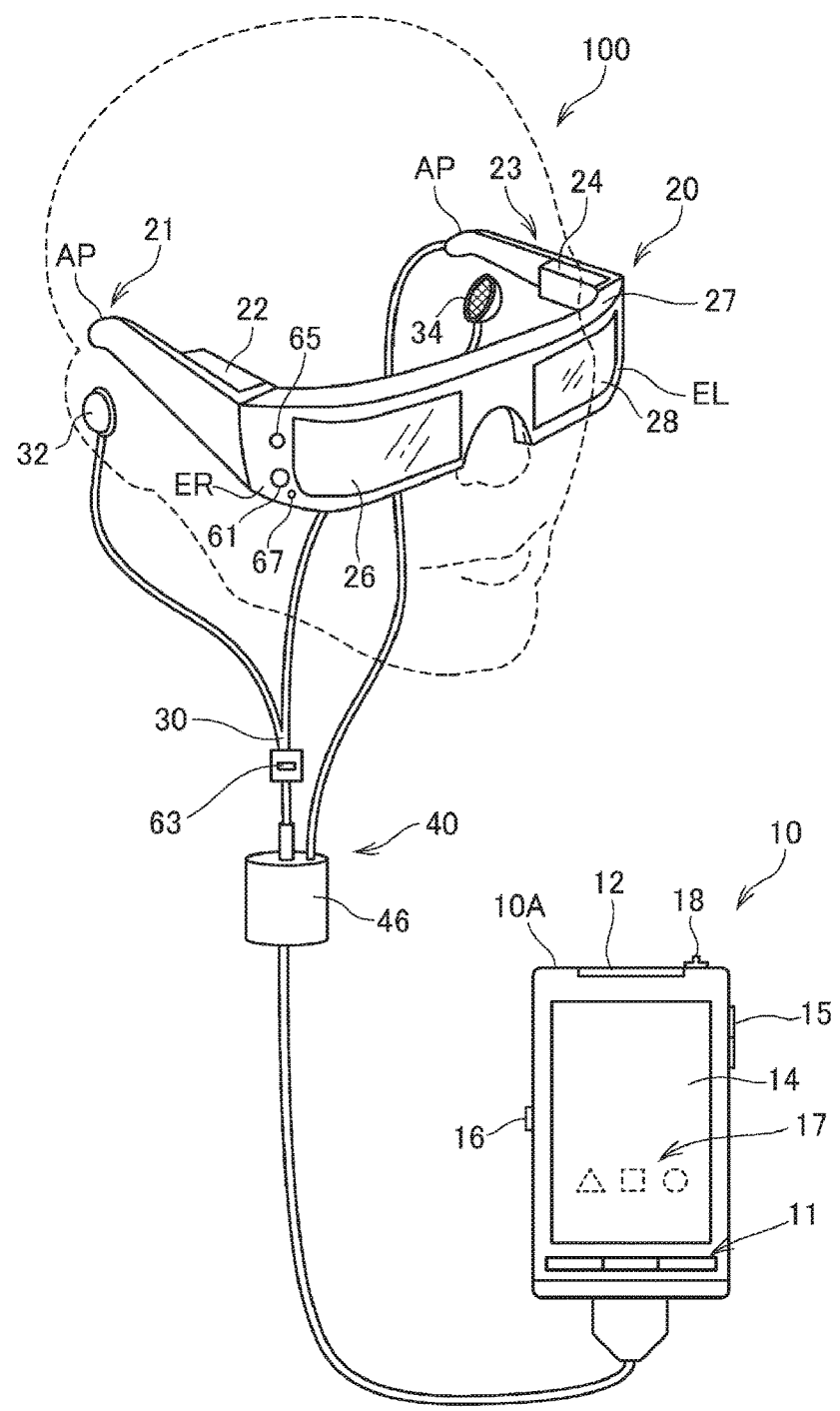
FIG. 1 is a diagram showing an exterior configuration of an HMD.

FIG. 1 is a diagram showing an exterior configuration of a head-mounted display (HMD) 100 according to an embodiment to which the invention is applied.

The HMD 100 is a display device including an image display unit 20 (display unit) that makes a user visually perceive a virtual image in a state of being worn on the user's head, and a control device 10 that controls the image display unit 20. The control device 10 (operation device) includes a flat box-shaped case 10A (also referred to as a housing or a main body) as shown in FIG. 1, and includes units to be described later in the case 10A. Various buttons 11, a switch, a track pad 14, and the like, which receive a user's operation, are provided on the surface of the case 10A. The user operates these, and thus the control device 10 functions as a controller of the HMD 100.

The image display unit 20 is a body which is worn on a user's head, and has a shape of spectacles in the present embodiment. The image display unit 20 includes a right display unit 22, a left display unit 24, a right light guiding plate 26, and a left light guiding plate 28 in a main body including a right holding portion 21, a left holding portion 23, and a front frame 27.

Each of the right holding portion 21 and the left holding portion 23 extend backward from both ends of the front frame 27, and holds the image display unit 20 on a user's head like a temple (bow) of spectacles. Here, among both ends of the front frame 27, an end positioned on the right side of the user in a wearing state of the image display unit 20 is set to be an end ER, and an end positioned on the left side of the user is set to be an end EL. The right holding portion 21 is provided so as to extend from the end ER of the front frame 27 to a position corresponding to the user's right head side in a wearing state of the image display unit 20. The left holding portion 23 is provided so as to extend from the end EL to a position corresponding to the user's left head side in a wearing state of the image display unit 20.

The right light guiding plate 26 and the left light guiding plate 28 are provided at the front frame 27. The right light guiding plate 26 is positioned in front of the user's right eye in a wearing state of the image display unit 20, and makes the right eye to visually perceive an image. The left light guiding plate 28 is positioned in front of the user's left eye in a wearing state of the image display unit 20, and makes the left eye to visually perceive an image.

The front frame 27 has a shape in which an end of the right light guiding plate 26 and an end of the left light guiding plate 28 are connected to each other, and the connection position corresponds to the user's *glabella* in a state where the user wears the image display unit 20. The front frame 27 may be provided with a nose pad portion abutting on the user's nose in a wearing state of the image display unit 20, at a position where the right light guiding plate 26 and the left light guiding plate 28 are connected to each other. In this case, the image display unit 20 can be held by the user's head by the nose pad portion, the right holding portion 21, and the left holding portion 23. In addition, a belt (not shown) coming into contact with the back of the user's head in a wearing state of the image display unit 20 may be connected to the right holding portion 21 and the left holding portion 23. In this case, the image display unit 20 can be held by the user's head by using the belt.

The right display unit 22, which is a unit related to the display of an image using the right light guiding plate 26, is provided at the right holding portion 21 and is positioned in the vicinity of the user's right head side in a wearing state. The left display unit 24, which is a unit related to the display of an image using the left light guiding plate 28, is provided at the left holding portion 23 and is positioned in the vicinity of the user's left head side in a wearing state. Meanwhile, the right display unit 22 and the left display unit 24 are also collectively referred to as a "display driving unit".

The right light guiding plate 26 and the left light guiding plate 28 of the present embodiment are optical units, such as prisms, which are formed of a light transmissive resin or the like, and guide image light output from the right display unit 22 and the left display unit 24 to the user's eyes.

In addition, a light control plate (not shown) may be provided on the surface of each of the right light guiding plate 26 and the left light guiding plate 28. The light control plate is an optical element, having a thin film shape, which has transmittance varying depending on a wavelength region of light, and functions as a so-called wavelength filter. For example, the light control plate is disposed so as to cover the front side of the front frame 27 which is a side opposite to a side of the user's eyes. Optical characteristics of the light control plate are appropriately selected, and thus it is possible to adjust the transmittance of light having any wavelength region, such as visible light, infrared light, or ultraviolet light, and to adjust the amount of external light which is incident on the right light guiding plate 26 and the left light guiding plate 28 from the outside and passes through the right light guiding plate 26 and the left light guiding plate 28.

The image display unit 20 guides image light beams respectively generated by the right display unit 22 and the left display unit 24 to the right light guiding plate 26 and the left light guiding plate 28 and makes a user to visually perceive a virtual image by the image light beams, thereby displaying an image. In a case where external light having passed through the right light guiding plate 26 and left light guiding plate 28 is incident on a user's eyes from the front of the user, image light and external light constituting a virtual image are incident on the user's eyes, and the visibility of the virtual image is affected by the intensity of the external light. For this reason, for example, a light control plate is mounted on the front frame 27, and optical characteristics of the light control plate are appropriately selected or adjusted, thereby allowing the easiness of visual perception of the virtual image to be adjusted. In a typical example, it is possible to use a light control plate having a light transmittance such an extent that a user wearing the HMD 100 can visually perceive at least outside scene. In addition, when the light control plate is used, it is possible to expect effects of protecting the right light guiding plate 26 and the left light guiding plate 28 and suppressing the damage of the right light guiding plate 26 and the left light guiding plate 28, the attachment of dirt thereto, and the like. The light control plate may be configured to be attached and detached to and from the front frame 27 or each of the right light guiding plate 26 and the left light guiding plate 28, a plurality of types of light control plates may be exchangeably mounted, or the light control plate may be omitted.

A camera 61 is disposed at the front frame 27 of the image display unit 20. It is desired that the camera 61 images a direction of an outside scene which is visually perceived by a user wearing the image display unit 20, and the camera is provided at a position that does not shield external light passing through the right light guiding plate 26 and the left light guiding plate 28 on the front surface of the front frame 27. In the example of FIG. 1, the camera 61 is disposed on the end ER side of the front frame 27. The camera 61 may be disposed on the end EL side, or may be disposed at a connecting portion between the right light guiding plate 26 and the left light guiding plate 28.

The camera 61 is a digital camera including an imaging element, such as a CCD or a CMOS, an imaging lens, and the like. The camera 61 of the present embodiment is a monocular camera, but may be constituted by a stereo camera. The camera 61 images at least a portion of an outside scene (real space) in the front direction of the HMD 100, in other words, a direction of a user's field of vision in a wearing state of the HMD 100. In another expression, it can be said that the camera 61 performs imaging in a range or a direction which overlaps the user's field of vision and performs imaging in the user's eye gaze direction. The range of an angle of view of the camera 61 can be appropriately set, but includes an outside world which is visually perceived by the user through the right light guiding plate 26 and the left light guiding plate 28 in the present embodiment, as described later. More preferably, an imaging range of the camera 61 is set so as to be capable of imaging the entire field of vision of the user which is capable of being visually perceived through the right light guiding plate 26 and the left light guiding plate 28.

The camera 61 performs imaging under the control of an imaging control unit 149 included in a control unit 150 (FIG. 5), and outputs captured image data to the imaging control unit 149.

The HMD 100 may include a distance sensor (not shown) that detects a distance to an object to be measured which is positioned in a preset measurement direction. For example, the distance sensor can be disposed at a connecting portion between the right light guiding plate 26 and the left light guiding plate 28 in the front frame 27. In this case, the position of the distance sensor is substantially the middle between a user's both eyes in a horizontal direction in a wearing state of the image display unit 20, and is above the user's both eyes in a vertical direction. The measurement direction of the distance sensor can be set to be, for example, the front direction of the front frame 27, in other words, a direction overlapping an imaging direction of the camera 61. The distance sensor can be configured to include a light source, such as an LED or a laser diode, and a light reception portion that receives reflected light of light, emitted from the light source, which is reflected from the object to be measured. The distance sensor may perform a triangulation process or a distance measurement process based on a time difference under the control of the control unit 150. In addition, the distance sensor may be configured to include a sound source that generates ultrasonic waves and a detection unit that receives ultrasonic waves reflected from an object to be measured. In this case, the distance sensor may perform a distance measurement process on the basis of a time difference to the reflection of ultrasonic waves under the control of the control unit 150.

Figure 2:
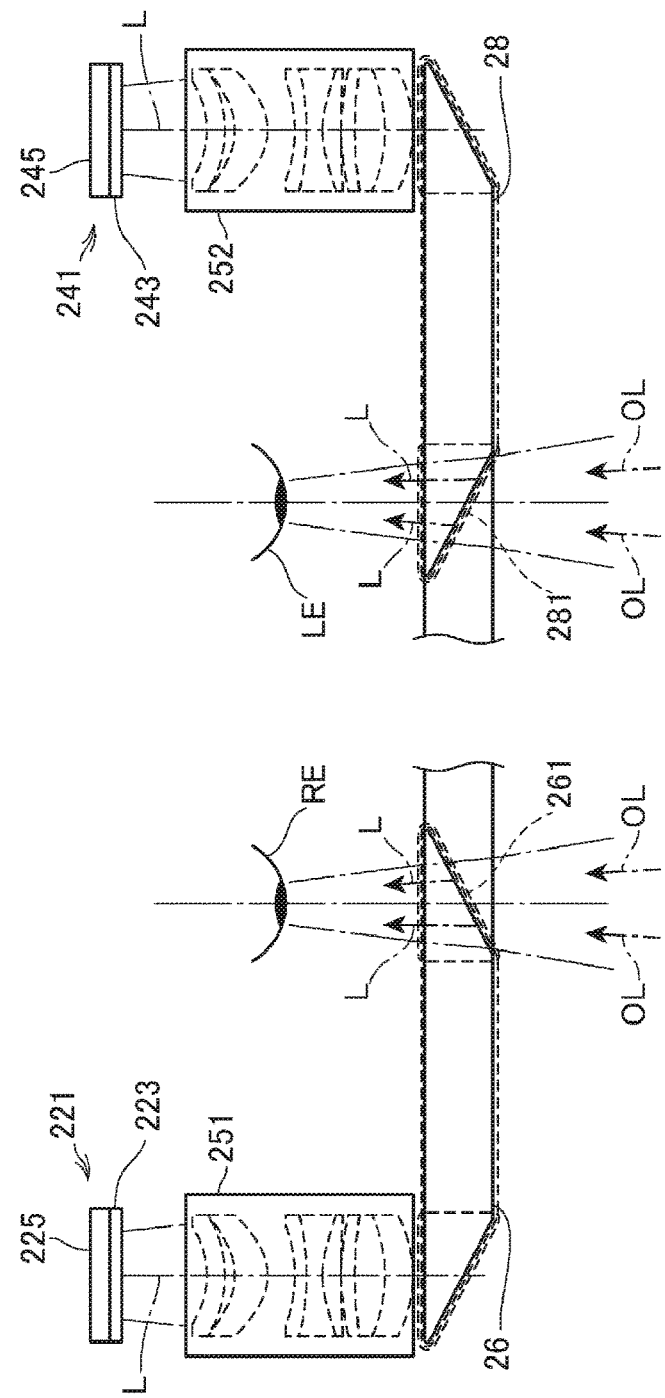
FIG. 2 is a diagram showing a configuration of an optical system of an image display unit.

FIG. 2 is a plan view showing main components in a configuration of an optical system included in the image display unit 20. FIG. 2 shows a left eye LE and a right eye RE of a user for convenience of description.

As shown in FIG. 2, the right display unit 22 and the left display unit 24 are configured to be bilaterally symmetrical to each other. As a configuration in which the user's right eye RE visually perceives an image, the right display unit 22 includes an organic light emitting diode (OLED) unit 221 that emits image light, and a right optical system 251 that includes a lens group guiding image light L emitted by the OLED unit 221, and the like. The image light L is guided to the right light guiding plate 26 by the right optical system 251.

The OLED unit 221 includes an OLED panel 223, and an OLED driving circuit 225 that drives the OLED panel 223. The OLED panel 223 is a self-emitting display panel which is configured such that light emitting elements respectively emitting red (R), green (G), and blue (B) light beams by organic electroluminescence are arranged in a matrix. The OLED panel 223 includes a plurality of pixels with a unit having R, G, and B elements one by one as one pixel, and forms an image by pixels that are arranged in a matrix. The OLED driving circuit 225 performs selection of the light emitting element included in the OLED panel 223 and electrical conduction to the light emitting element under the control of the control unit 150 (FIG. 5), thereby making the light emitting element of the OLED panel 223 emit light. The OLED driving circuit 225 is fixed to the rear surface of the OLED panel 223, that is, the back of a light emitting surface by bonding or the like. The OLED driving circuit 225 is constituted by, for example, a semiconductor device that drives the OLED panel 223, and may be mounted on a substrate (not shown) which is fixed to the rear surface of the OLED panel 223. A temperature sensor 217 is mounted on the substrate.

Meanwhile, the OLED panel 223 may be configured such that light emitting elements emitting white light beams are arranged in a matrix and color filters corresponding to R, G, and B colors are arranged so as to overlap each other. In addition, a WRGB OLED panel 223 including a light emitting element emitting a white (W) light beam, in addition to light emitting elements emitting R, G, and B light beams, may be used.

The right optical system 251 includes a collimate lens that collimates image light L emitted from the OLED panel 223 into a parallel luminous flux. The image light L collimated into a parallel luminous flux by the collimate lens is incident on the right light guiding plate 26. A plurality of reflection surfaces reflecting the image light L are formed in a light path that guides light inside the right light guiding plate 26. The image light L is guided to the right eye RE side through a plurality of times of reflection inside the right light guiding plate 26. A half mirror 261 (reflection surface) which is positioned in front of the right eye RE is formed in the right light guiding plate 26. The image light L is reflected from the half mirror 261 and is emitted from the right light guiding plate 26 toward the right eye RE, and the image light L forms an image on the retina of the right eye RE, thereby allowing a user to visually perceive the image.

In addition, as a configuration in which an image is visually perceived by a user's left eye LE, the left display unit 24 includes an OLED unit 241 that emits image light, and a left optical system 252 that includes a lens group guiding image light L emitted by the OLED unit 241, and the like. The image light L is guided to the left light guiding plate 28 by the left optical system 252.

The OLED unit 241 includes an OLED panel 243, and an OLED driving circuit 245 that drives the OLED panel 243. The OLED panel 243 is a self-emitting display panel which is configured in the same manner as the OLED panel 223. The OLED driving circuit 245 performs selection of a light emitting element included in the OLED panel 243 and electrical conduction to the light emitting element under the control of the control unit 150 (FIG. 5), thereby making the light emitting element of the OLED panel 243 emit light. The OLED driving circuit 245 is fixed to the rear surface of the OLED panel 243, that is, the back of a light emitting surface by bonding or the like. The OLED driving circuit 245 is constituted by, for example, a semiconductor device that drives the OLED panel 243, and may be mounted on a substrate (not shown) which is fixed to the rear surface of the OLED panel 243. A temperature sensor 239 is mounted on the substrate.

The left optical system 252 includes a collimate lens that collimates image light L emitted from the OLED panel 243 into a parallel luminous flux. The image light L collimated into a parallel luminous flux by the collimate lens is incident on the left light guiding plate 28. The left light guiding plate 28 is an optical element in which a plurality of reflection surfaces reflecting the image light L are formed, and is, for example, a prism. The image light L is guided to the left eye LE side through a plurality of times of reflection inside the left light guiding plate 28. A half mirror 281 (reflection surface) which is positioned in front of the left eye LE is formed in the left light guiding plate 28. The image light L is reflected from the half mirror 281 and is emitted from the left light guiding plate 28 toward the left eye LE, and the image light L forms an image on the retina of the left eye LE, thereby allowing a user to visually perceive the image.

According to this configuration, the HMD 100 functions as a see-through type display device. That is, the image light L reflected from the half mirror 261 and external light OL having passed through the right light guiding plate 26 are incident on the user's right eye RE. In addition, the image light L reflected from the half mirror 281 and external light OL having passed through the half mirror 281 are incident on the left eye LE. In this manner, the HMD 100 makes image light L of an image processed therein and external light OL, overlapping each other, incident on a user's eyes. The user can view an outside scene through the right light guiding plate 26 and the left light guiding plate 28, and the image based on the image light L is visually perceived so as to overlap the outside scene.

The half mirrors 261 and 281 are image extraction units that reflect image light beams respectively output by the right display unit 22 and the left display unit 24 to extract an image, and can be referred to as display units.

Meanwhile, the left optical system 252 and the left light guiding plate 28 are also collectively referred to as a "left light guiding portion", and the right optical system 251 and the right light guiding plate 26 are collectively referred to as a "right light guiding portion". Configurations of the right light guiding portion and the left light guiding portion are not limited to the above-mentioned example, and any system can be used as long as a virtual image is formed in front of a user's eyes using image light. For example, a diffraction grating may be used, or a semi-transmissive reflection film may be used.

Referring back to FIG. 1, the control device 10 and the image display unit 20 are connected to each other by a connection cable 40. The connection cable 40 is detachably connected to a connector (not shown) which is provided below the case 10A, and is connected to various circuits provided inside the image display unit 20 from the tip end of the left holding portion 23. The connection cable 40 may include a metal cable or an optical fiber cable that transmits digital data, or may include a metal cable that transmits an analog signal. A connector 46 is provided in the middle of the connection cable 40. The connector 46 is a jack for connecting a stereo mini plug, and the connector 46 and the control device 10 are connected to each other, for example, through a line that transmits an analog sound signal. In a configuration example shown in FIG. 1, a headset 30 including right and left ear phones 32 and 34 constituting a stereo headphone and a microphone 63 is connected to the connector 46.

Figure 4:
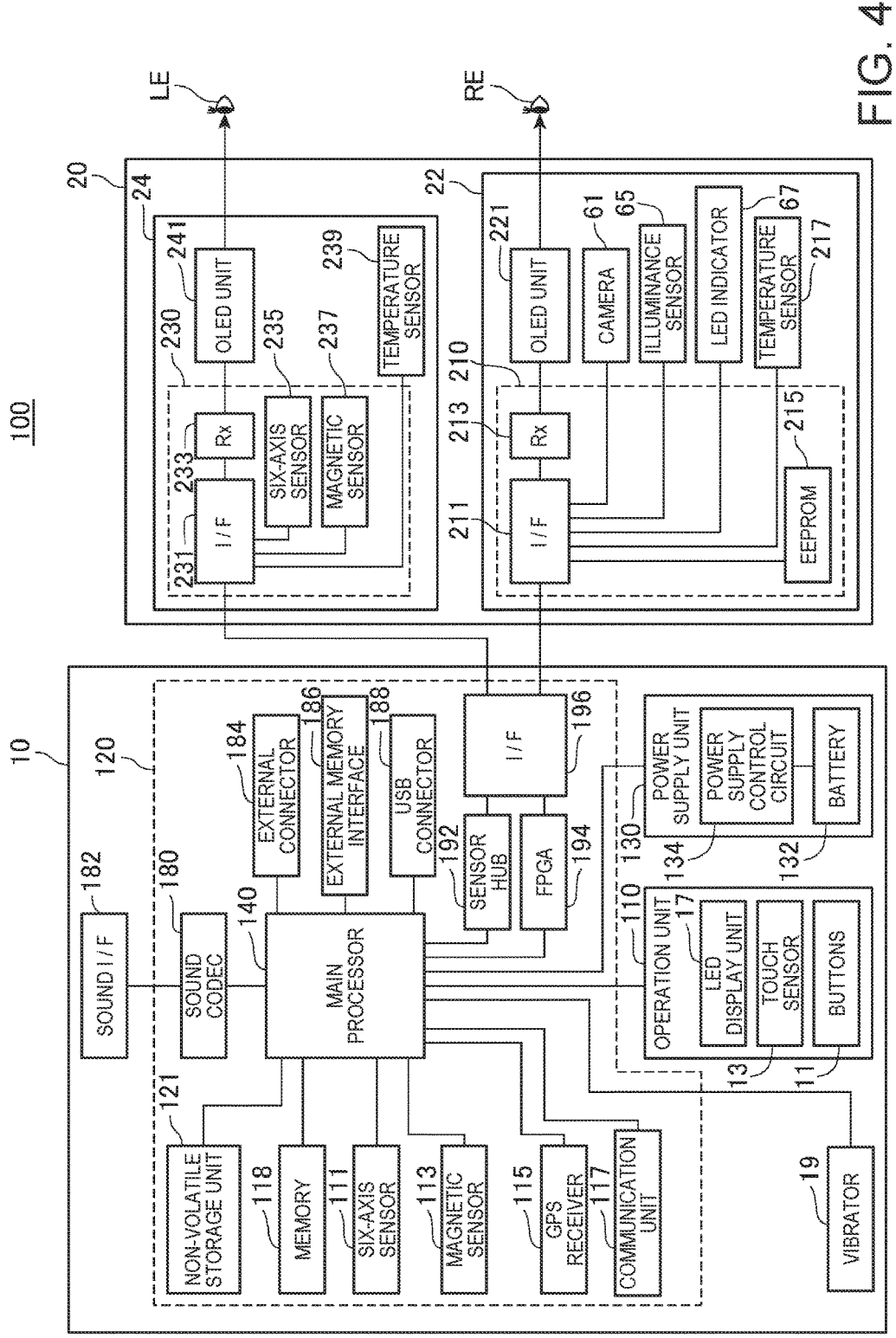
FIG. 4 is a block diagram of units constituting the HMD.

The microphone 63, which is disposed such that a sound collection portion of the microphone 63 is directed in a user's eye gaze direction, for example, as shown in FIG. 1, collects a sound and outputs a sound signal to a sound interface 182 (FIG. 4). The microphone 63 may be, for example, a monaural microphone or a stereo microphone, may be a microphone having directivity, or may be a non-directional microphone.

The control device 10 includes buttons 11, an LED indicator 12, a track pad 14, up and down keys 15, a changeover switch 16, and a power supply switch 18 as units to be operated by a user. These units to be operated are disposed on the surface of the case 10A.

The buttons 11 include a menu key for performing the operation of the operating system 143 (FIG. 5) which is performed by the control device 10, a home key, a return key, and the like. In particular, the keys and the switches include keys and switches which are displaced by a pressing operation. The LED indicator 12 is turned on or turned off in response to an operation state of the HMD 100. The up and down keys 15 are used to input an instruction for turning up or down sound volume which is output from the right ear phone 32 and the left ear phone 34 and to input an instruction for increasing or decreasing the brightness of display of the image display unit 20. The changeover switch 16 is a switch that changes over an input corresponding to the operation of the up and down keys 15. The power supply switch 18 is a switch that changes over the turn-on and turn-off of the power supply of the HMD 100, and is constituted by, for example, a slide switch.

The track pad 14 (operation reception unit, position indication operation unit) has an operation surface for detecting a contact operation, and outputs an operation signal in response to an operation performed on the operation surface. A detection method in the operation surface is not limited, and an electrostatic method, a pressure detection method, an optical method, or the like can be adopted. Contact (touch operation) with the track pad 14 is detected by the touch sensor 13 (FIG. 4) to be described later.

In addition, as indicated by a dashed line in FIG. 1, the track pad 14 is provided with an LED display unit 17. The LED display unit 17 includes a plurality of LEDs, and an operation unit can be visually perceived on the LED display unit 17 by the lighting of the LEDs. In the example of FIG. 1, three marks of Δ (triangle), ○ (circle), and □ (quadrangle) are shown when the LEDs of the LED display unit 17 are turned on. In a state where the LED display unit 17 is turned off, these marks cannot be visually perceived. This configuration can be realized by constituting the track pad 14, for example, by a colored or colorless transparent flat plate having a light-transmissive property and disposing an LED just below the flat plate.

The LED display unit 17 functions as a software button. For example, while the LED display unit 17 is being turned on, a lighting position (display position) of a mark functions as a button for performing an indication corresponding to the mark. In the example of FIG. 1, the mark ○ (circle) functions as a home button, and the control unit 150 to be described later detects the operation of the home button on the basis of a detected value of the touch sensor 13 when an operation of contacting the position of the mark ○ (circle) is performed. In addition, the mark □ (quadrangle) functions as a history button. When an operation of contacting the position of the mark □ (quadrangle) is performed, the control unit 150 to be described later detects the operation of the history button on the basis of a detected value of the touch sensor 13. In addition, the mark Δ (triangle) functions as a return button. When an operation of contacting the position of the mark Δ (triangle) is performed, the control unit 150 to be described later detects the operation of the return button on the basis of a detected value of the touch sensor 13.

Figure 3A:
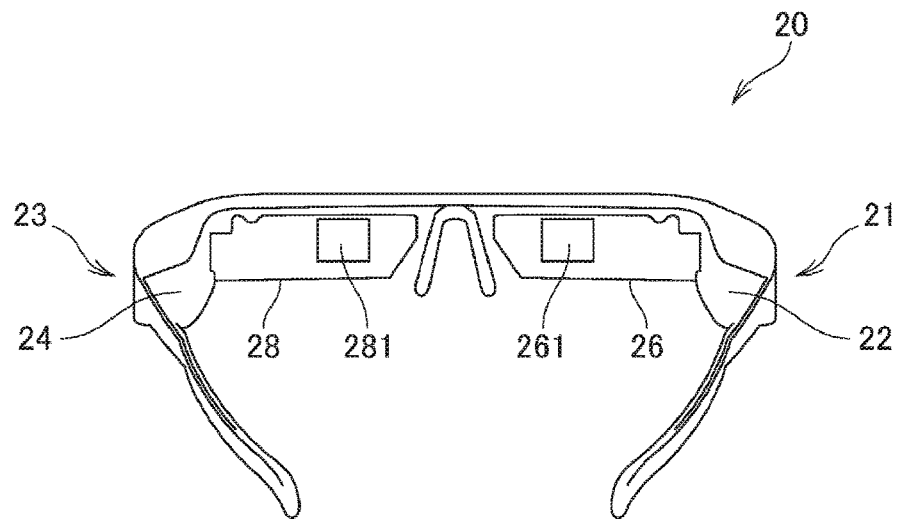
FIGS. 3A and 3B are diagrams showing association between the image display unit and an imaging range.
Figure 3B:
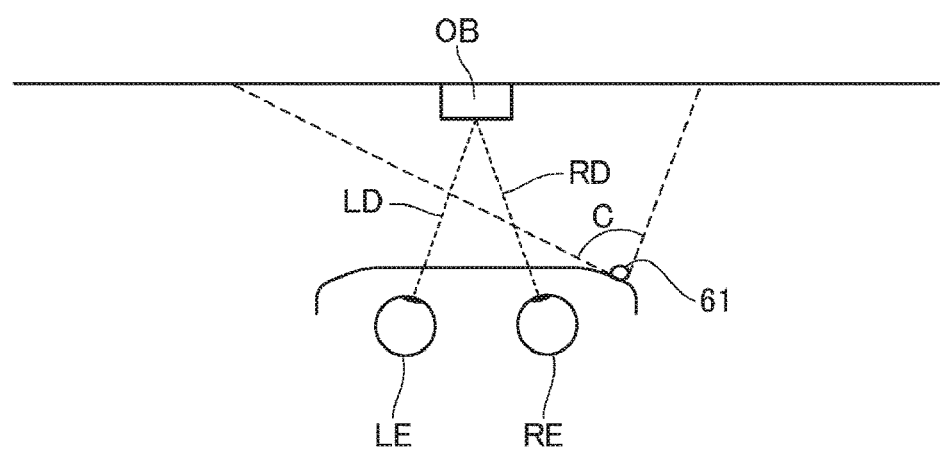

FIGS. 3A and 3B are diagrams showing main components of the image display unit 20. FIG. 3A is a perspective view showing main components when the image display unit 20 is seen from a user's head side, and FIG. 3B is a diagram showing an angle of view of the camera 61. Meanwhile, in FIG. 3A, the connection cable 40 is not shown.

FIG. 3A shows a side coming into contact with the head of a user of the image display unit 20, in other words, a side viewed by the user's right eye RE and left eye LE. In other words, the back sides of the right light guiding plate 26 and the left light guiding plate 28 are viewed.

In FIG. 3A, the half mirror 261 irradiating the user's right eye RE with image light and the half mirror 281 irradiating the user's left eye LE with image light are viewed as a substantially quadrangular region. In addition, the entirety of the right light guiding plate 26 and the left light guiding plate 28 respectively including the half mirrors 261 and 281 transmit external light as described above. For this reason, an outside scene is visually perceived by the user through the entirety of the right light guiding plate 26 and the left light guiding plate 28, and a rectangular display image is visually perceived at the positions of the half mirrors 261 and 281.

The camera 61 is disposed at the right end in the image display unit 20 as described above, and performs imaging in a direction in which both eyes of a user are directed, that is, images a front side for the user. FIG. 3B is a schematic diagram showing the position of the camera 61 together with a right eye RE and a left eye LE of a user, when seen in a plan view. An angle of view (imaging range) of the camera 61 is denoted by C. Meanwhile, FIG. 3B shows the angle of view C in the horizontal direction, but a real angle of view of the camera 61 is also extended in the vertical direction, similar to a general digital camera.

An optical axis of the camera 61 is set to be a direction including eye gaze directions of the right eye RE and the left eye LE. An outside scene capable of being visually perceived by a user wearing the HMD 100 is not limited to infinity. For example, as shown in FIG. 3B, when the user's both eyes gaze at an object OB, the user's eye gaze is directed to the object OB as indicated by signs RD and LD in the drawing. In this case, a distance from the user to the object OB is in a range of approximately 30 cm to approximately 10 m in many cases, and is in a range of approximately 1 m to approximately 4 m in more cases. Consequently, standards of an upper limit and a lower limit of a distance from the user to the object OB during the normal use may be determined with respect to the HMD 100. The standards may be obtained by examination or experiment, or may be set by a user. It is preferable that the optical axis and angle of view of the camera 61 are set so that the object OB is included in the angle of view in a case where a distance to the object OB during the normal use is equivalent to the set standard of the upper limit and is equivalent to the set standard of the lower limit.

In addition, generally, a human's viewing angle is set to approximately 200 degrees in the horizontal direction and is set to approximately 125 degrees in the vertical direction. Here, an effective field of view excellent in an information reception capacity is approximately 30 degrees in the horizontal direction and is approximately 20 degrees in the vertical direction. Further, a stable eye gaze field in which a human's eye gaze point is rapidly and stably viewed is set to 60 degrees to 90 degrees in the horizontal direction and is set to 45 degrees to 70 degrees in the vertical direction. In this case, when the eye gaze point is the object OB of FIG. 3B, 30 degrees in the horizontal direction and 20 degrees in the vertical direction centering on eye gazes RD and LD are effective fields of view. In addition, approximately 60 degrees to 90 degrees in the horizontal direction and approximately 45 degrees to 70 degrees in the vertical direction are stable eye gaze fields, and approximately 200 degrees in the horizontal direction and approximately 125 degrees in the vertical direction are viewing angles. Further, a real field of view visually perceived by a user through the image display unit 20 and the right and left light guiding plates 26 and 28 can be referred to as a real field of view (FOV). In the configuration of the present embodiment shown in FIGS. 1 and 2, a real field of view is equivalent to a real field of view which is visually perceived by a user through the right light guiding plate 26 and the left light guiding plate 28. The real field of view is narrower than a viewing angle and a stable eye gaze field, but is wider than an effective field of view.

It is preferable that the angle of view C of the camera 61 allows a range wider than a user's field of view to be capable of being imaged. Specifically, it is preferable that the angle of view C is wider than at least a user's effective field of view. In addition, it is more preferable that the angle of view C is wider than a user's real field of view. More preferably, the angle of view C is wider than a user's stable eye gaze field, and most preferably, the angle of view C is wider than a viewing angle of a user's both eyes.

The camera 61 includes a so-called wide angle lens as an imaging lens, and may be configured to be capable of performing imaging at a wide angle of view. The wide angle lens may include lenses which are called a super-wide angle lens and a semi-wide angle lens, or may be a single focus lens or a zoom lens. Alternatively, the camera 61 may be configured to include a lens group constituted by a plurality of lenses.

FIG. 4 is a block diagram showing the configuration of units constituting the HMD 100.

The control device 10 includes a main processor 140 that executes a program to control the HMD 100. A memory 118 and a non-volatile storage unit 121 are connected to the main processor 140. In addition, the track pad 14 and an operation unit 110 as input devices are connected to the main processor 140. In addition, a six-axis sensor 111, a magnetic sensor 113, and a GPS 115, as sensors, are connected to the main processor 140. In addition, a communication unit 117, a sound codec 180, an external connector 184, an external memory interface 186, a USB connector 188, a sensor hub 192, and an FPGA 194 are connected to the main processor 140. These function as interfaces for connection to the outside.

The main processor 140 is mounted on a controller substrate 120 built into the control device 10. In addition to the main processor 140, the memory 118, the non-volatile storage unit 121, and the like may be mounted on the controller substrate 120. In the present embodiment, the six-axis sensor 111, the magnetic sensor 113, the GPS 115, the communication unit 117, the memory 118, the non-volatile storage unit 121, the sound codec 180, and the like are mounted on the controller substrate 120. In addition, a configuration may also be adopted in which the external connector 184, the external memory interface 186, the USB connector 188, the sensor hub 192, the FPGA 194, and the interface 196 are mounted on the controller substrate 120.

In a case where the main processor 140 executes a program, the memory 118 constitutes a work area in which the program to be executed and data to be processed are temporarily stored. The non-volatile storage unit 121 is constituted by a flash memory and an embedded multimedia card (eMMC). The non-volatile storage unit 121 stores programs executed by the main processor 140, and various pieces of data which are processed by the execution of the main processor 140.

The main processor 140 detects a contact operation with respect to the operation surface of the track pad 14 on the basis of an operation signal which is input from the track pad 14, and acquires the operation position thereof.

The operation unit 110 includes the buttons 11, the touch sensor 13, and the LED display unit 17. The touch sensor 13 detects a touch operation performed on the track pad 14, and specifies the operation position of the detected touch operation. In a case where the operation of the buttons 11 is performed and the touch sensor 13 detects a touch operation, an operation signal is output from the operation unit 110 to the main processor 140.

The LED display unit 17 includes an LED (not shown) which is disposed just below the track pad 14 (FIG. 1), and a driving circuit for turning on the LED. The LED display unit 17 turns on, flickers, and turns off the LED under the control of the main processor 140.

Light emission patterns of the LED of the LED display unit 17 are shown in FIGS. 6A and 6B.

FIGS. 6A and 6B are timing charts showing changes in the luminance of the LED of the LED display unit 17. In the light emission pattern shown in FIG. 6A, the LED display unit 17 periodically turns on the LED, and the luminance of the LED sharply rises and falls. On the other hand, in the light emission pattern of FIG. 6B, the luminance of the LED changes slowly. The LED display unit 17 turns on the LED with the pattern shown in FIG. 6A or 6B under the control of the main processor 140. In addition, the LED display unit 17 may turn on the LED at all times. In addition, in the pattern shown in FIG. 6A or 6B, time T1 at which the LED is turned on and time T2 at which the LED is turned off are arbitrary. For example, the times T1 and T2 may be set to equal to or less than 100 milliseconds. In this case, even when the LED is repeatedly turned on and turned off, the LED can be visually perceived by a user so as to be continuously turned on. In addition, the LED display unit 17 may control a ratio of the time T1 to the time T2 to thereby perform PWM control on the luminance of the LED.

Referring back to FIG. 4, the six-axis sensor 111 is a motion sensor (inertial sensor) including a three-axis acceleration sensor and a three-axis gyro (angular velocity) sensor. An inertial measurement unit (IMU) in which the above-mentioned sensors are modularized may be adopted as the six-axis sensor 111.

The magnetic sensor 113 is, for example, a three-axis geomagnetic sensor.

The global positioning system (GPS) 115, including a GPS antenna not shown in the drawing, receives a wireless signal transmitted from a GPS satellite to thereby detect coordinates of the current position of the control device 10.

The six-axis sensor 111, the magnetic sensor 113, and the GPS 115 output a detected value to the main processor 140 in accordance with a sampling cycle which is designated in advance. Alternatively, the six-axis sensor 111, the magnetic sensor 113, and the GPS 115 output a detected value to the main processor 140 at a timing which is designated by the main processor 140, in accordance with a request of the main processor 140.

The communication unit 117 performs wireless communication with an external device. The communication unit 117 is configured to include an antenna, an RF circuit, a base band circuit, a communication control circuit, and the like, or is constituted by a device in which the antenna and the circuits are integrated. The communication unit 117 performs wireless communication based on a standard such as Bluetooth (registered trademark) or a wireless LAN (including Wi-Fi (registered trademark)).

The sound interface 182 is an interface that inputs and outputs a sound signal. In the present embodiment, the sound interface 182 includes the connector 46 (FIG. 1) which is provided in the connection cable 40. The sound codec 180 is connected to the sound interface 182, and performs encoding and decoding of a sound signal which is input and output through the sound interface 182. In addition, the sound codec 180 may include an A/D converter that converts an analog sound signal into a digital sound data, and a D/A converter that performs the reverse conversion. For example, the HMD 100 of the present embodiment outputs a sound through the right ear phone 32 and the left ear phone 34, and collects a sound by the microphone 63. The sound codec 180 converts digital sound data which is output by the main processor 140 into an analog sound signal, and outputs the converted data through the sound interface 182. In addition, the sound codec 180 converts an analog sound signal which is input to the sound interface 182 into digital sound data, and outputs the converted signal to the main processor 140.

The external connector 184 is a connector for connection of an external device communicating with the main processor 140. The external connector 184 is an interface that connects, for example, an external device to the main processor 140 and performs connection of the external device in a case where the debugging of a program to be executed by the main processor 140 and the collection of logs of operation of the HMD 100 are performed.

The external memory interface 186 is an interface capable of performing connection of a portable memory device, and includes, for example, a memory card slot, which is mounted with a card type recording medium so as to be capable of reading data, and an interface circuit. In this case, the size, shape, and standard of the card type recording medium are not limited, and can be appropriately changed.

The universal serial bus (USB) connector 188 includes a connector and an interface circuit based on a USB standard, and can be used to connect a USB memory device, a smart phone, a computer, and the like. The version of a USB standard which is appropriate for the size and shape of the USB connector 188 can be appropriately selected and changed.

In addition, the HMD 100 includes a vibrator 19. The vibrator 19 includes a motor (not shown), an eccentric rotor (not shown), and the like, and generates vibration under the control of the main processor 140. The HMD 100 generates vibration by the vibrator 19 with a predetermined vibration pattern, for example, in a case where an operation with respect to the operation unit 110 is detected, in a case where the power supply of the HMD 100 is turned on or turned off, and the like.

The sensor hub 192 and the FPGA 194 are connected to the image display unit 20 through the interface (I/F) 196. The sensor hub 192 acquires detected values of the various sensors included in the image display unit 20 and outputs the acquired values to the main processor 140. In addition, the FPGA 194 performs the processing of data transmitted and received between the main processor 140 and each unit of the image display unit 20 and the transmission of the data through the interface 196.

Each of the right display unit 22 and the left display unit 24 of the image display unit 20 is connected to the control device 10. As shown in FIG. 1, in the HMD 100, the connection cable 40 is connected to the left holding portion 23, wirings connected to the connection cable 40 are laid inside the image display unit 20, and each of the right display unit 22 and the left display unit 24 is connected to the control device 10.

The right display unit 22 includes a display unit substrate 210. The display unit substrate 210 is mounted with an interface (I/F) 211 which is connected to the interface 196, a reception unit (Rx) 213 that receives data which is input from the control device 10 through the interface 211, and an EEPROM 215 (storage unit).

The interface 211 connects the reception unit 213, the EEPROM 215, the temperature sensor 217, the camera 61, the illuminance sensor 65, and the LED indicator 67 to the control device 10.

The electrically erasable programmable read-only memory (EEPROM) 215 stores various pieces of data so as to be capable of being read by the main processor 140. The EEPROM 215 stores, for example, data regarding light emission characteristics and display characteristics of the OLED units 221 and 241 included in the image display unit 20, data regarding characteristics of the sensor included in the right display unit 22 or the left display unit 24, and the like. Specifically, the EEPROM stores parameters related to gamma correction of the OLED units 221 and 241, data for compensating for detected values of the temperature sensors 217 and 239, and the like. These pieces of data are generated by examination during the shipment of the HMD 100 from a plant and are written in the EEPROM 215. After the shipment, the main processor 140 can perform processing using the data of the EEPROM 215.

The camera 61 performs imaging in response to a signal which is input through the interface 211, and outputs captured image data or a signal indicating an imaging result to the control device 10.

The illuminance sensor 65 is provided at the end ER of the front frame 27 as shown in FIG. 1, and is disposed so as to receive external light from the front of a user wearing the image display unit 20. The illuminance sensor 65 outputs a detected value corresponding to the amount of light received (light receiving intensity).

The LED indicator 67 is disposed in the vicinity of the camera 61 at the end ER of the front frame 27, as shown in FIG. 1. The LED indicator 67 is turned on during imaging using the camera 61 to notify that imaging is being performed.

The temperature sensor 217 detects temperature and outputs a voltage value or a resistance value corresponding to the detected temperature, as a detected value. The temperature sensor 217 is mounted on the rear surface side of the OLED panel 223 (FIG. 2). For example, the temperature sensor 217 may be mounted on the same substrate as that of the OLED driving circuit 225. With such a configuration, the temperature sensor 217 mainly detects the temperature of the OLED panel 223.

The reception unit 213 receives data which is transmitted by the main processor 140 through the interface 211. In a case where the reception unit 213 receives image data of an image displayed on the OLED unit 221, the reception unit outputs the received image data to the OLED driving circuit 225 (FIG. 2).

The left display unit 24 includes the display unit substrate 210. The display unit substrate 210 is mounted with an interface (I/F) 231 which is connected to the interface 196, and a reception unit (Rx) 233 that receives data which is input from the control device 10 through the interface 231. In addition, a six-axis sensor 235 and a magnetic sensor 237 are mounted on the display unit substrate 210.

The interface 231 connects the reception unit 233, the six-axis sensor 235, the magnetic sensor 237, and the temperature sensor 239 to the control device 10.

The six-axis sensor 235 (display unit movement detection unit) is a motion sensor (inertial sensor) that includes a three-axis acceleration sensor and a three-axis gyro (angular velocity) sensor. An inertial measurement unit (IMU) in which the above-mentioned sensors are modularized may be adopted as the six-axis sensor 235.

The magnetic sensor 237 is, for example, a three-axis geomagnetic sensor.

The temperature sensor 239 detects temperature and outputs a voltage value or a resistance value corresponding to the detected temperature, as a detected value. The temperature sensor 239 is mounted on the rear surface side of the OLED panel 243 (FIG. 2). For example, the temperature sensor 239 may be mounted on the same substrate as that of the OLED driving circuit 245. With such a configuration, the temperature sensor 239 mainly detects the temperature of the OLED panel 243.

In addition, the temperature sensor 239 may be built into the OLED panel 243 or the OLED driving circuit 245. In addition, the above-mentioned substrate may be a semiconductor substrate. Specifically, in a case where the OLED panel 243 is mounted as an integrated circuit on an integrated semiconductor chip together with the OLED driving circuit 245 and the like as an Si-OLED, the temperature sensor 239 may be mounted on the semiconductor chip.

The camera 61, the illuminance sensor 65, and the temperature sensor 217 which are included in the right display unit 22 and the six-axis sensor 235, the magnetic sensor 237, and the temperature sensor 239 which are included in the left display unit 24 are connected to the sensor hub 192. The sensor hub 192 performs setting of a sampling cycle of each sensor and initialization under the control of the main processor 140. The sensor hub 192 performs electrical conduction to each sensor, the transmission of control data, the acquisition of a detected value, and the like in accordance with a sampling cycle of each sensor. In addition, the sensor hub 192 outputs detected values of the sensors included in the right display unit 22 and the left display unit 24 to the main processor 140 at a timing which is set in advance. The sensor hub 192 may have a function of temporarily holding the detected values of the sensors in accordance with a timing of output to the main processor 140. In addition, the sensor hub 192 may have a function of performing conversion into data in a united data format in response to differences between signal formats of output values of the respective sensors or data formats thereof and outputting the converted data to the main processor 140.

In addition, the sensor hub 192 starts and stops electrical conduction to the LED indicator 67 under the control of the main processor 140, and turns on or turns off the LED indicator 67 in accordance with timings at which the camera 61 starts and terminates imaging.

The control device 10 includes a power supply unit 130, and operates by power supplied from the power supply unit 130. The power supply unit 130 includes a battery 132 which is rechargeable, and a power supply control circuit 134 that detects a remaining amount of the battery 132 and controls the charging of the battery 132. The power supply control circuit 134 is connected to the main processor 140, and outputs a detected value of the remaining amount of the battery 132 or a detected value of a voltage to the main processor 140. In addition, power may be supplied from the control device 10 to the image display unit 20 on the basis of power supplied by the power supply unit 130. In addition, a configuration may also be adopted in which the supply of power from the power supply unit 130 to each unit of the control device 10 and the image display unit 20 can be controlled by the main processor 140.

Figure 5:
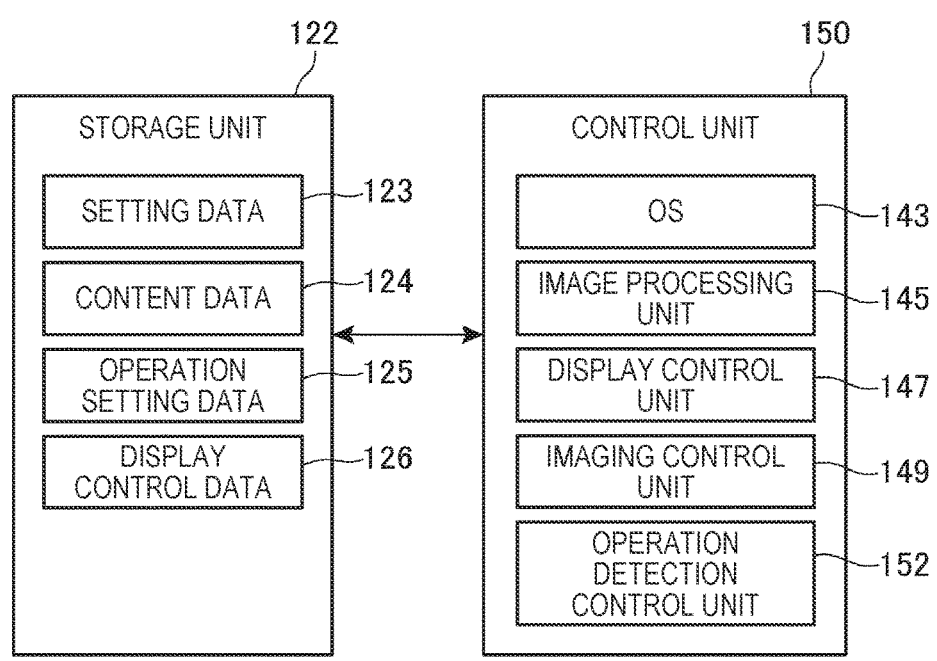
FIG. 5 is a block diagram showing a control unit and a storage unit.

FIG. 5 is a functional block diagram showing the storage unit 122 and the control unit 150 which constitute a control system of the control device 10. The storage unit 122 shown in FIG. 5 is a logical storage unit constituted by the non-volatile storage unit 121 (FIG. 4), and may include the EEPROM 215. In addition, the control unit 150 and various functional units included in the control unit 150 are formed by cooperation of software and hardware by the main processor 140 executing programs. The control unit 150 and the functional units constituting the control unit 150 are constituted by, for example, the main processor 140, the memory 118, and the non-volatile storage unit 121.

The control unit 150 performs various processes using data stored in the storage unit 122 and controls the HMD 100.

The storage unit 122 stores various pieces of data processed by the control unit 150. The storage unit 122 stores setting data 123, content data 124, operation setting data 125, and display control data 126. The setting data 123 includes various setting values related to the operation of the HMD 100. In addition, parameters, a matrix expression, an arithmetic expression, a lookup table (LUT), and the like may be included in the setting data 123 when being used by the control unit 150 at the time of controlling the HMD 100.

The content data 124 is data of contents including an image or a video which is displayed by the image display unit 20 under the control of the control unit 150, and includes image data or video data. In addition, the content data 124 may include sound data. In addition, the content data 124 may include image data of a plurality of images. In this case, the plurality of images are not limited to images that are simultaneously displayed by the image display unit 20.

In addition, the content data 124 may be bidirectional type contents in which a user's operation is received by the control device 10 at the time of displaying contents on the image display unit 20 and the control unit 150 performs processing in accordance with the received operation. In this case, the content data 124 may include image data of a menu screen displayed in a case where an operation is received, data for determining processing corresponding to an item included in the menu screen, and the like.

The operation setting data 125 is data which is used in a process in which the control unit 150 detects a motion operation of moving the control device 10. The operation setting data 125 includes data for determining individual motions with respect to patterns of one or a plurality of movements that are set in advance, as motions of the case 10A. Specifically, the operation setting data includes a detected value of a movement detected by the six-axis sensor 111 or data regarding a change in the detected value for each type of motion. This data may include a plurality of detected values of the six-axis sensor 111, or may be data regarding a feature amount obtained by an arithmetic operation from the detected values. The operation setting data 125 may be data which is used to be capable of determining whether or not the case 10A has performed movement corresponding to a motion which is set, from the detected values of the six-axis sensor 111. More preferably, the operation setting data is data which is used to be capable of specifying a motion corresponding to the movement of the case 10A which is detected by the six-axis sensor 111, among the plurality of motions which are set.

The display control data 126 is data which is used in a process of changing a display state of an image displayed by the image display unit 20, in response to the motion of the case 10A. In more detail, the display control data includes data indicating a mode for changing a display state in association with the set motion of the case 10A. In a case where the control unit 150 detects and specifies the motion of the case 10A on the basis of the operation setting data 125, the control unit changes the display of the image display unit 20 in a mode which is set in the display control data 126 in association with the specified motion.

The control unit 150 has functions of the operating system (OS) 143, an image processing unit 145, a display control unit 147, an imaging control unit 149, and an operation detection control unit 152. The function of the operating system 143 is a function of a control program stored in the storage unit 122, and the functions of the other units are functions of application programs executed on the operating system 143.

The image processing unit 145 generates a signal transmitted to the right display unit 22 and the left display unit 24 on the basis of image data of an image or a video which is displayed by the image display unit 20. The signal generated by the image processing unit 145 may be a vertical synchronization signal, a horizontal synchronization signal, a clock signal, an analog image signal, or the like.

In addition, the image processing unit 145 may perform a resolution conversion process of converting the resolution of image data into resolution suitable for the right display unit 22 and the left display unit 24 as necessary. In addition, the image processing unit 145 may perform an image adjustment process of adjusting the luminance or chroma of image data, a 2D/3D conversion process of creating 2D image data from 3D image data or creating 3D image data from 2D image data, and the like. In a case where the image processing unit 145 performs such imaging processing, the image processing unit generates a signal for displaying an image on the basis of processed image data and transmits the generated signal to the image display unit 20 through the connection cable 40.

The image processing unit 145 may be constituted by hardware (for example, a digital signal processor (DSP)) which is different from the main processor 140, in addition to being realized by the main processor 140 executing a program.

The display control unit 147 generates a control signal for controlling the right display unit 22 and the left display unit 24, and controls the generation and emission of image light which are performed by each of the right display unit 22 and the left display unit 24 in response to the control signal. Specifically, the display control unit 147 controls the OLED driving circuits 225 and 245 to thereby perform the display of an image by the OLED panels 223 and 243. The display control unit 147 performs the control of a timing drawn on the OLED panels 223 and 243 by the OLED driving circuits 225 and 245, the control of the luminance of the OLED panels 223 and 243, and the like on the basis of a signal which is output by the image processing unit 145.

In addition, in a case where the operation detection control unit 152 detects the motion of the control device 10, the display control unit 147 changes a display mode of an image displayed on the image display unit 20, or the like in accordance with the display control data 126.

The imaging control unit 149 controls the camera 61 to generate captured image data by imaging, and temporarily stores the generated image data in the storage unit 122. In addition, in a case where the camera 61 is configured as a camera unit including a circuit generating captured image data, the imaging control unit 149 acquires the captured image data from the camera 61 and temporarily stores the acquired image data in the storage unit 122.

The operation detection control unit 152 detects operations in the track pad 14 and the operation unit 110, and outputs data corresponding to the operations. For example, in a case where the buttons of the operation unit 110, or the like are operated, the operation detection control unit 152 generates operation data indicating operation contents and outputs the generated operation data to the display control unit 147. The display control unit 147 changes a display state in accordance with the operation data which is input from the operation detection control unit 152.

The operation detection control unit 152 detects the operation of a software button while the LED display unit 17 is being turned on. The operation detection control unit 152 detects a contact operation with respect to the position of a mark displayed by the turn-on of the LED display unit 17 as the operation of a button (software operator) to which a function is allocated in advance, while the LED display unit 17 is being turned on.

For example, in the example of FIG. 1, an operation of coming into contact with the position of the mark ○ (circle) is detected as the operation of the home button which is allocated to the position of the mark ○ (circle) in advance. In this case, the operation detection control unit 152 makes a display screen of the image display unit 20 and an operation state of the control device 10 transition to a basic state of the operating system 143.

In addition, for example, in the example of FIG. 1, an operation of coming into contact with the position of the mark □ (quadrangle) is detected as the operation of the history button which is allocated to the position of the mark □ (quadrangle). In this case, the operation detection control unit 152 displays a display screen of the image display unit 20 or a screen indicating the past operation state of the control device 10 by the image display unit 20.

The operation detection control unit 152 specifies the movement of the case 10A on the basis of a detected value of the six-axis sensor 111, and determines whether or not the movement of the case 10A corresponds to a motion which is set in advance. In addition, in the present embodiment, the operation detection control unit 152 performs a process of specifying a motion corresponding to the movement of the case 10A. In this process, the operation detection control unit 152 acquires a detected value of the six-axis sensor 111. In addition, the operation detection control unit may acquire a plurality of detected values detected by the six-axis sensor 111. For example, in a case where the six-axis sensor 111 performs detection with a predetermined cycle, the operation detection control unit may continuously acquire the plurality of detected values that are successively detected by the six-axis sensor 111. The operation detection control unit 152 may store the detected values of the six-axis sensor 111 in the memory 118 or the non-volatile storage unit 121 as necessary. For example, a ring buffer may be formed in the memory 118 or the non-volatile storage unit 121, and the operation detection control unit 152 may acquire a detected value of the six-axis sensor 111 at all times and may store the acquired detected value in the ring buffer. In this case, the number of latest detected values corresponding to the capacity of the ring buffer is stored in the ring buffer. The operation detection control unit 152 can perform the above-described process on the basis of the detected values stored in the ring buffer and the operation setting data 125.

In addition, in a case where the operation detection control unit 152 detects an operation in the track pad 14, the operation detection control unit acquires coordinates of an operation position in an operation detection region (detection region) of the track pad 14.

The HMD 100 may include an interface (not shown) for connection of various external devices which are sources supplying contents. For example, the interface may be an interface, such as a USB interface, a micro USB interface, an interface for a memory card, which corresponds to wired connection, or may be constituted by a wireless communication interface. In this case, the external device is an image supply device that supplies an image to the HMD 100. A personal computer (PC), a mobile phone terminal, a portable game machine, or the like is used as the external device. In this case, the HMD 100 can output an image or a sound based on content data which is input from the external devices.

Figure 7A:
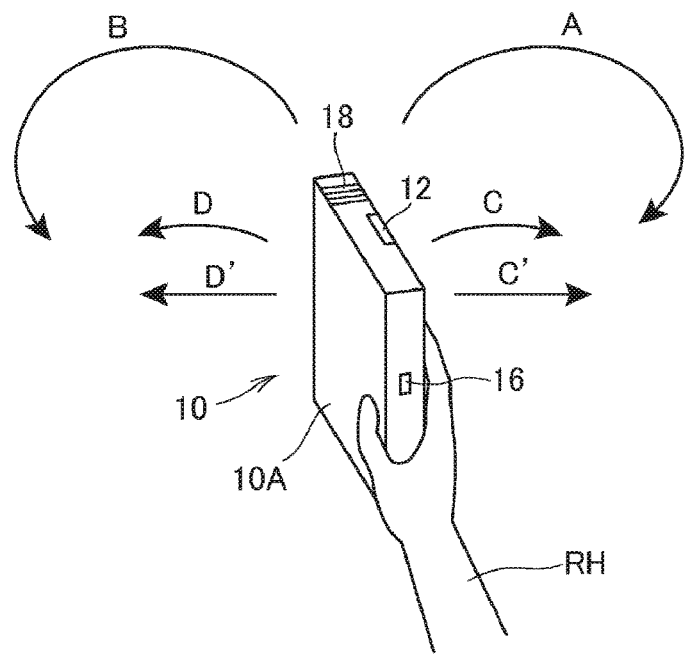
FIGS. 7A and 7B are diagrams showing an operation example using a control device.
Figure 7B:
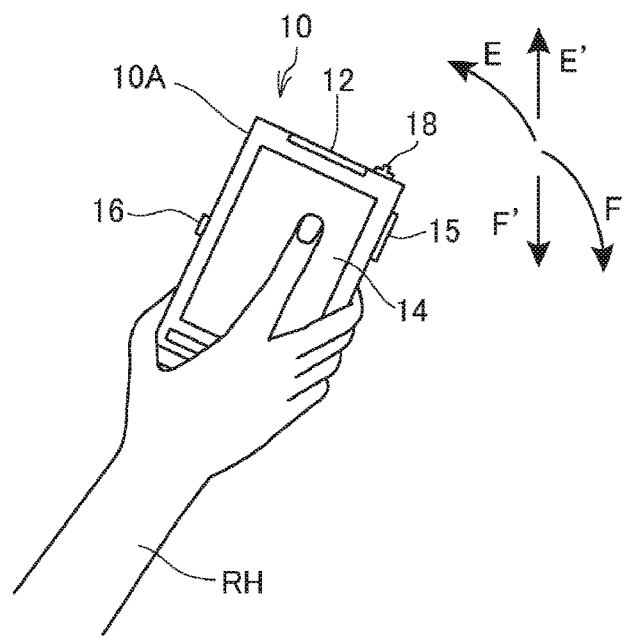

FIGS. 7A and 7B are diagrams showing an operation example using the control device 10, and specifically show an example of a motion of moving the case 10A. Both FIGS. 7A and 7B show a state where a user holds the case 10A in his or her hand. FIG. 7A is a front view when the control device 10 is seen from the user side, and FIG. 7B is a side view. Meanwhile, the connection cable 40 is not shown in FIGS. 7A and 7B.

In the present embodiment, six motions are specified in advance as modes of an operation of moving the control device 10.

FIG. 7A shows four motions A, B, C, and D. FIG. 7B shows two motions E and F.

In the example shown in the drawing, a user grasps the case 10A with his or her right hand RH, but may grasp the case with his or her left hand. In addition, the user may hold the case 10A in a join manner using a jig or the like.

The motion A is an operation of rotating the control device 10 clockwise (CW) on the basis of the right and left of the user's body, as indicated by an arrow A in the drawing. The six-axis sensor 111 detects an acceleration and an angular velocity which indicate the clockwise movement of the case 10A. The motion B is an operation of rotating the control device 10 counterclockwise (CCW) as indicated by an arrow B in the drawing. The motion A can be referred to as a right rotation operation, and the motion B can be referred to as a left rotation operation.

A right-left direction in a case where a user uses the case by holding the case in his or her hand, as shown in the drawing, is set in the control device 10 in advance. For example, as shown in FIGS. 7A and 7B, in a case where the user holds the case 10A in his or her hand, the direction may be specified in advance such that an upper end of the case 10A faces upward and a surface having the track pad 14 disposed thereon is directed to the user's right side. Meanwhile, the upper end face of the case 10A refers to a face on which the LED indicator 12 and the power supply switch 18 are provided. In addition, a configuration may be adopted in which the user can set surfaces of the case 10A which are set to be the right side and the left side, in a case where the control device 10 is held in the user's hand, by operating the HMD 100. In this case, the operation setting data 125 includes data in which a detection direction of the six-axis sensor 111 and the right and left of the user's body are associated with each other.

The motion C is an operation of moving the control device 10 in such a manner as to draw an arc rightward as indicated by an arrow C in the drawing, and the motion D is an operation of moving the control device 10 in such a manner as to draw an arc leftward as indicated by an arrow D in the drawing. The motion C can be referred to as a rightward movement operation, and the motion D can be referred to as a leftward movement operation.

Meanwhile, as indicated by an arrow C' in the drawing, a configuration may also be adopted in which an operation of linearly moving the control device 10 to the right is detected as the motion C. Similarly, as indicated by an arrow D' in the drawing, a configuration may also be adopted in which an operation of linearly moving the control device 10 to the left is detected as the motion D.

The motion E is an operation of moving the control device 10 in such a manner as to draw an arc upward as indicated by an arrow E in FIG. 7B. The motion F is an operation of moving the control device 10 in such a manner as to draw an arc downward as indicated by an arrow F in FIG. 7B. The motion E can be referred to as a swing-up operation, and the motion D can be referred to as a swing-down operation. As indicated by an arrow E' in the drawing, a configuration may also be adopted in which an operation of linearly moving the control device 10 upward is detected as the motion E. In addition, as indicated by an arrow F' in the drawing, a configuration may also be adopted in which an operation of linearly moving the control device 10 downward is detected as the motion E.

Some of the six motions are associated with each other as paired motions (movements). The motion A and the motion B are set as paired motions. Similarly, the motion C, the motion D, the motion E, and the motion F are set as paired motions. Hereinafter, paired motions are referred to as reverse motions. For example, the motion B is equivalent to the reverse motion of the motion A, and vice versa. The same is true of the motions C, D, E, and F.

Any one of the paired motions is equivalent to an operation (movement, motion) in a first movement direction, and the other is equivalent to an operation in a second movement direction. The first movement direction and the second movement direction are not limited to opposite directions. The directions may be directions in which operations can be detected as movements in different directions by the six-axis sensor 111 or the magnetic sensor 113 and/or the camera 61 which are used instead of the six-axis sensor 111. Each of the motions A to F, C', D', E', and F' is set as a movement in a specific direction, but a movement close to the specific direction may be regarded as a movement in the specific direction. For example, the motion C shown in FIG. 7A is a movement in the horizontal direction in the drawing, but a movement in a range of an angle of approximately five degrees may be detected as the motion C. A range in which motions are regarded as motions in the same direction may be arbitrarily set, and may be set to, for example, ±5 degrees or ±10 degrees. The same is true of the first movement direction and the second movement direction.

The operation detection control unit 152 detects six motions A to F of the case 10A, and the display control unit 147 controls the display of the image display unit 20 so as to correspond to the motion detected by the operation detection control unit 152.

FIGS. 8A to 8D, FIGS. 9A to 9C, and FIGS. 10A to 10C are diagrams showing changes in display corresponding to the operation of the HMD.

Figure 8A:
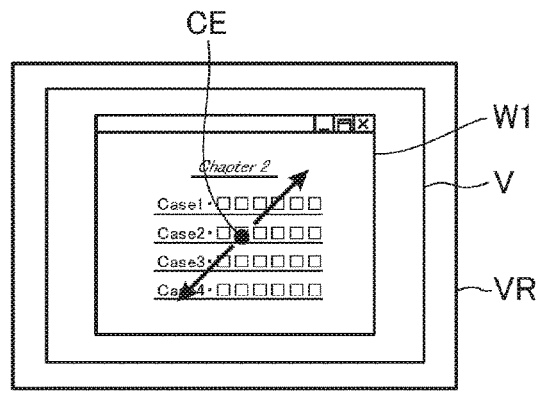
FIGS. 8A to 8D are diagrams showing changes in display corresponding to the operation of the HMD.
Figure 8B:
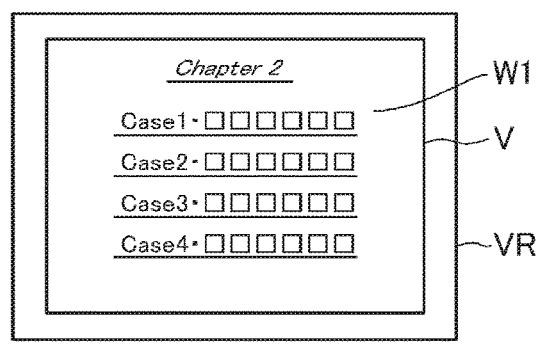
Figure 8C:
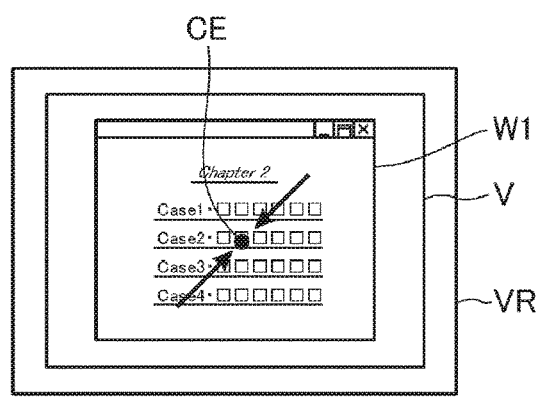
Figure 8D:
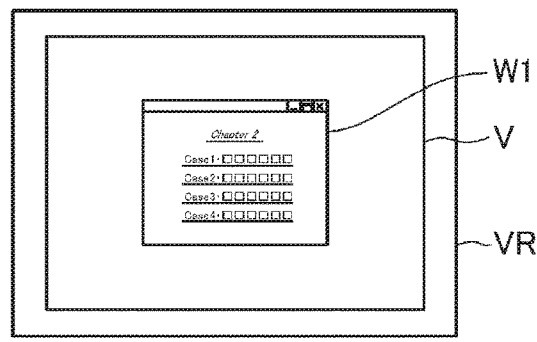

FIGS. 8A to 8D show examples in which display is enlarged and reduced. FIG. 8A shows a display example before enlargement, FIG. 8B shows a display example after enlargement, FIG. 8C shows a display example before reduction, and FIG. 8D shows a display example after reduction. A sign VR in the drawing indicates a user's field of view, and a sign V indicates a display region in which an image can be displayed by the right display unit 22 and the left display unit 24. Signs W1, W2, and W3 indicate a window as an example of an image displayed in the display region V.

In a case where display is enlarged as indicated by an arrow in the drawing in response to the motion of the case 10A from the state shown in FIG. 8A, the display control unit 147 determines a center position CE of an enlargement process in a display region V. The center position CE may be designated in accordance with an operation in the track pad 14, or may be automatically determined on the basis of the position of a pointer (not shown) and the like at the time of starting the enlargement process. In the example of FIG. 8B, a window W1 of the display region V shown in FIG. 8A is displayed in an enlarged manner centering on the center position CE. Comparing the display example of FIG. 8A with the display example of FIG. 8B, an enlargement ratio of the window W1 may be determined on the basis of an operation with respect to the control device 10 as described later with reference to a flow chart, or may be set in advance.

In addition, also in a case where display is reduced as indicated by an arrow in the drawing in response to the motion of the case 10A from the state shown in FIG. 8C, the display control unit 147 determines a center position CE of a reduction process in a display region V. The center position CE may be designated in accordance with an operation in the track pad 14, or may be automatically determined on the basis of the position of a pointer (not shown) and the like at the time of starting the enlargement process. In the example of FIG. 8D, a window W1 of the display region V shown in FIG. 8C is displayed in a reduced manner centering on the center position CE. Comparing the display example of FIG. 8C with the display example of FIG. 8D, a reduction ratio of the window W1 may be determined in accordance with an operation with respect to the control device 10 as described later with reference to a flow chart, or may be set in advance.

Figure 9A:
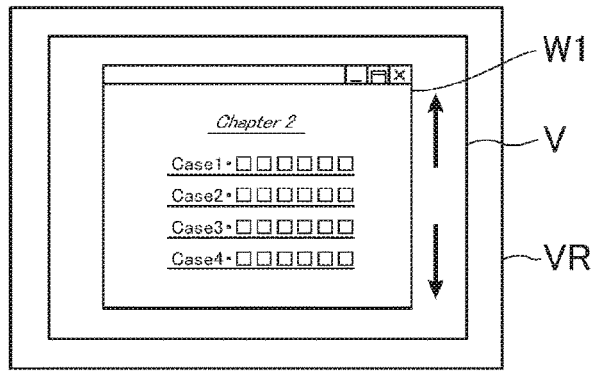
FIGS. 9A to 9C are diagrams showing changes in display corresponding to the operation of the HMD.
Figure 9B:
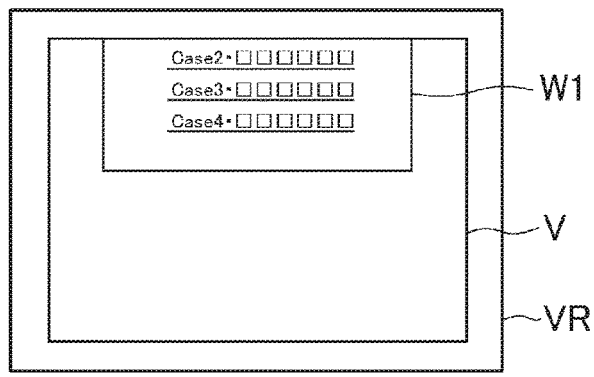
Figure 9C:
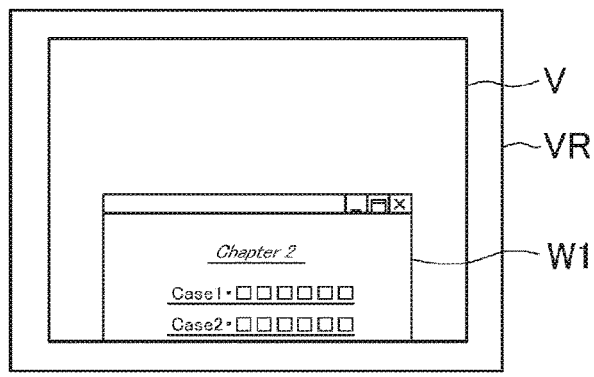

FIGS. 9A to 9C show an example in which display is scrolled. FIG. 9A shows a display example before scrolling, FIG. 9B shows a display example in which scrolling is performed upward, and FIG. 9C shows a display example in which scrolling is performed downward.

The display control unit 147 can scroll the display up and down in response to the motion of the case 10A, as indicated by an arrow in the drawing, from the state shown in FIG. 9A. In a case where scrolling is performed upward, a display position of a window W1 is moved upward as shown in FIG. 9B. In addition, in a case where scrolling is performed downward, a display position of the window W1 is moved downward as shown in FIG. 9C. As shown in the display examples of FIGS. 9A to 9C, the amount of scrolling of the window W1 may be determined in accordance with an operation with respect to the control device 10 as described later with reference to a flow chart, or may be set in advance.

Although not shown in the drawing, the display control unit 147 may perform horizontal scrolling of moving an image displayed in the display region V in the left direction or the right direction.

Any one of upward scrolling of FIG. 9B and downward scrolling of FIG. 9C is equivalent to a first display operation direction, and the other is equivalent to a second display operation direction. These scrolling operations are just examples, and the first display operation direction and the second display operation direction may be different directions of the movement of display. For example, a sideways (may be either rightward or leftward) scrolling direction and a vertical (may be either upward or downward) scrolling direction may be set to be the first display operation direction and the second display operation direction. In addition, the movement of display in an oblique direction may be set to be movement in the first display operation direction and/or the second display operation direction. That is, movements of display in two directions capable of recognized to be different directions by a user can be set to be movement in the first display operation direction and the second display operation direction.

In addition, FIGS. 9B and 9C show an example in which the upward scrolling of display is performed in response to an operation of moving the case 10A upward, and the downward scrolling of display is performed in response to an operation of moving the case 10A downward. These scrolling operations are just examples, and the movement direction of the case 10A which is detected by the six-axis sensor 111 and the movement direction of display do not have to be relatively set as the same direction with respect to a user. The direction of a movement detected by the six-axis sensor 111 and the movement direction of display may be associated with each other in advance, or may be, for example, opposite directions.

Figure 10A:
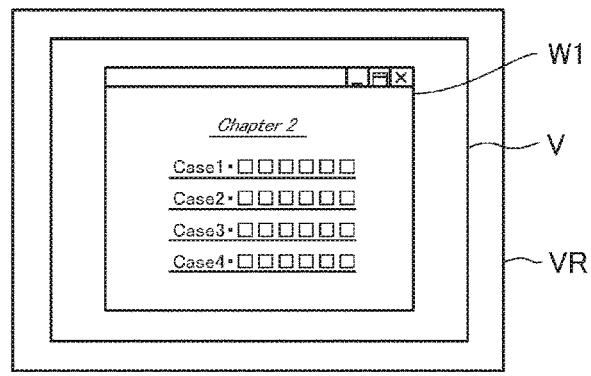
FIGS. 10A to 10C are diagrams showing changes in display corresponding to the operation of the HMD.
Figure 10B:
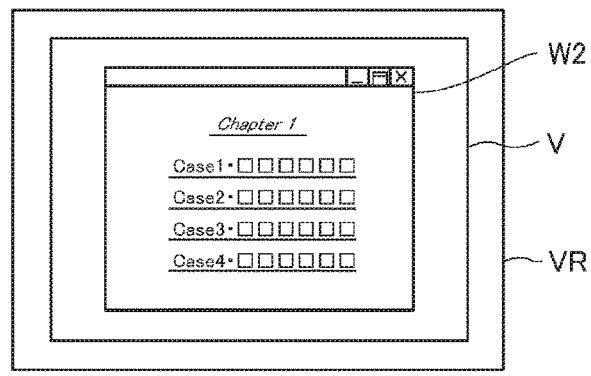
Figure 10C:
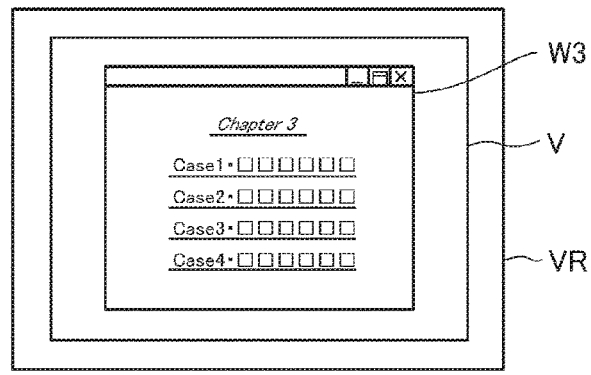

FIGS. 10A to 10C show an example in which display is changed over. FIG. 10A shows a display example before processing, FIG. 10B shows a display example in which display is shifted to the previous screen, and FIG. 10C shows a display example in which display is shifted to the next screen.

The examples shown in FIGS. 10A to 10C correspond to an example in which the content data 124 displayed by the display control unit 147 includes a plurality of images of which the display order is set, and the display control unit 147 changes over and displays images in accordance with the display order during the reproduction of the content data 124. These images are not limited to images such as a single photograph, and may be, for example, a combination of images or texts constituting one screen. Specifically, in a configuration in which the control unit 150 executes an application program on the operating system 143, a web page displayed by a web browser is an example of an image to be displayed. In addition, in a configuration in which a presentation program is executed as an application program, a slide sheet for presentation which includes a plurality of slide sheets is an example of the content data 124 including a plurality of images.

FIG. 10A shows an example in which a slide sheet for presentation is displayed, as an example. For example, in FIG. 10A, a window W1 including the slide sheet is displayed. In this state, when the display control unit 147 shifts a screen to the previous screen, a window W2 including the previous slide sheet is displayed in a display region V. In FIG. 10A, when the display control unit 147 shifts a screen to the next screen, a window W3 including the next slide sheet is displayed in a display region V.

In other words, the examples of FIGS. 10A to 10C show the display change of images being changed over in order and the display change of images being changed over in reverse order in an operation of displaying a plurality of images of which the display order is set.

In the present embodiment, setting is performed such that the display control unit 147 enlarges display in response to a motion A (clockwise rotation) and reduces display in response to a motion B (counterclockwise rotation). In addition, the display control unit 147 scrolls display upward in response to a motion E (swing-up), and scrolls display downward in response to a motion F (swing-down). In addition, the display control unit 147 shifts display to the next screen in response to a motion C (clockwise movement) and shifts display to the next screen in response to a motion D (counterclockwise movement).

Figure 11:
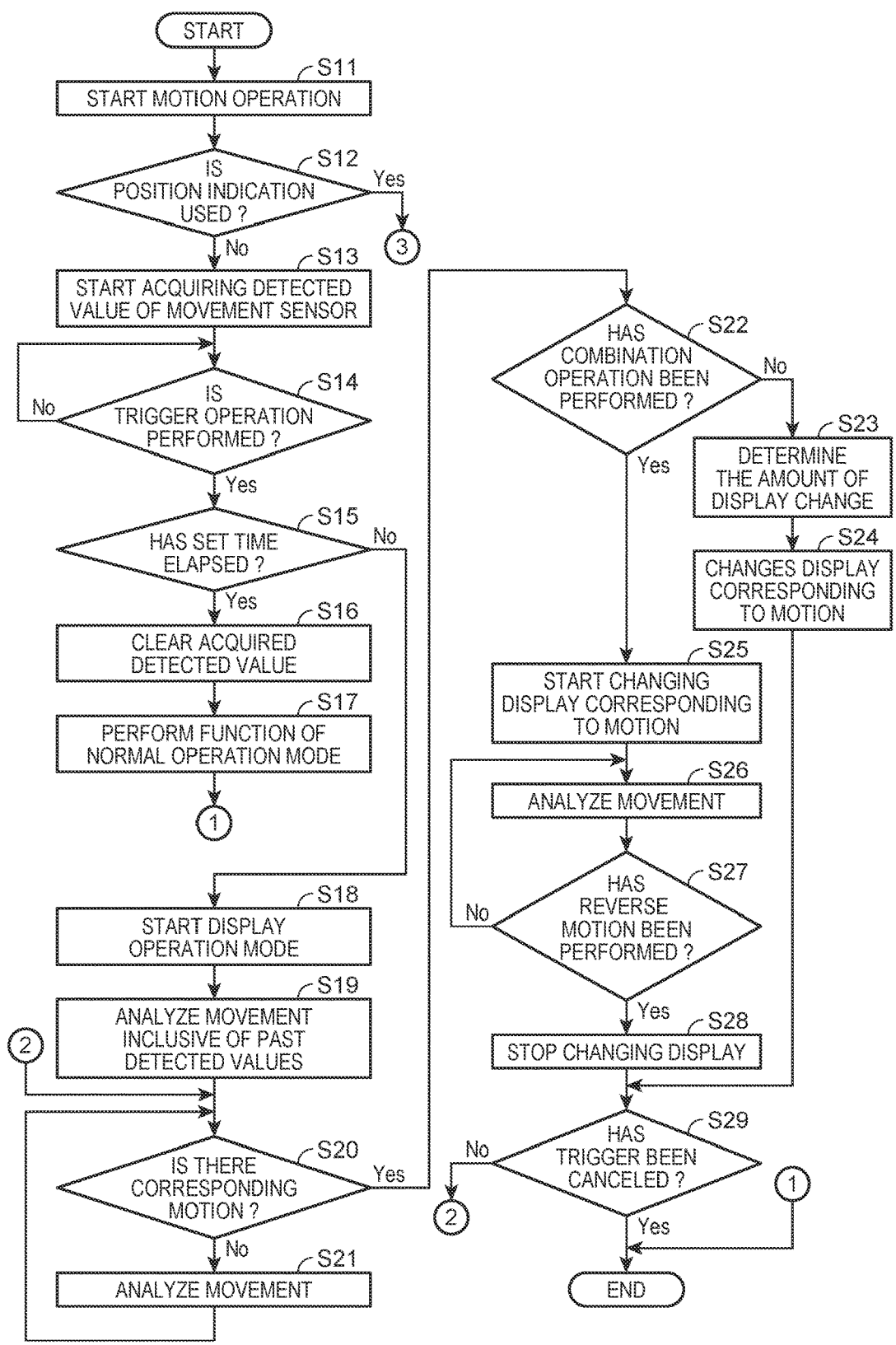
FIG. 11 is a flow chart showing the operation of the HMD.
Figure 12:
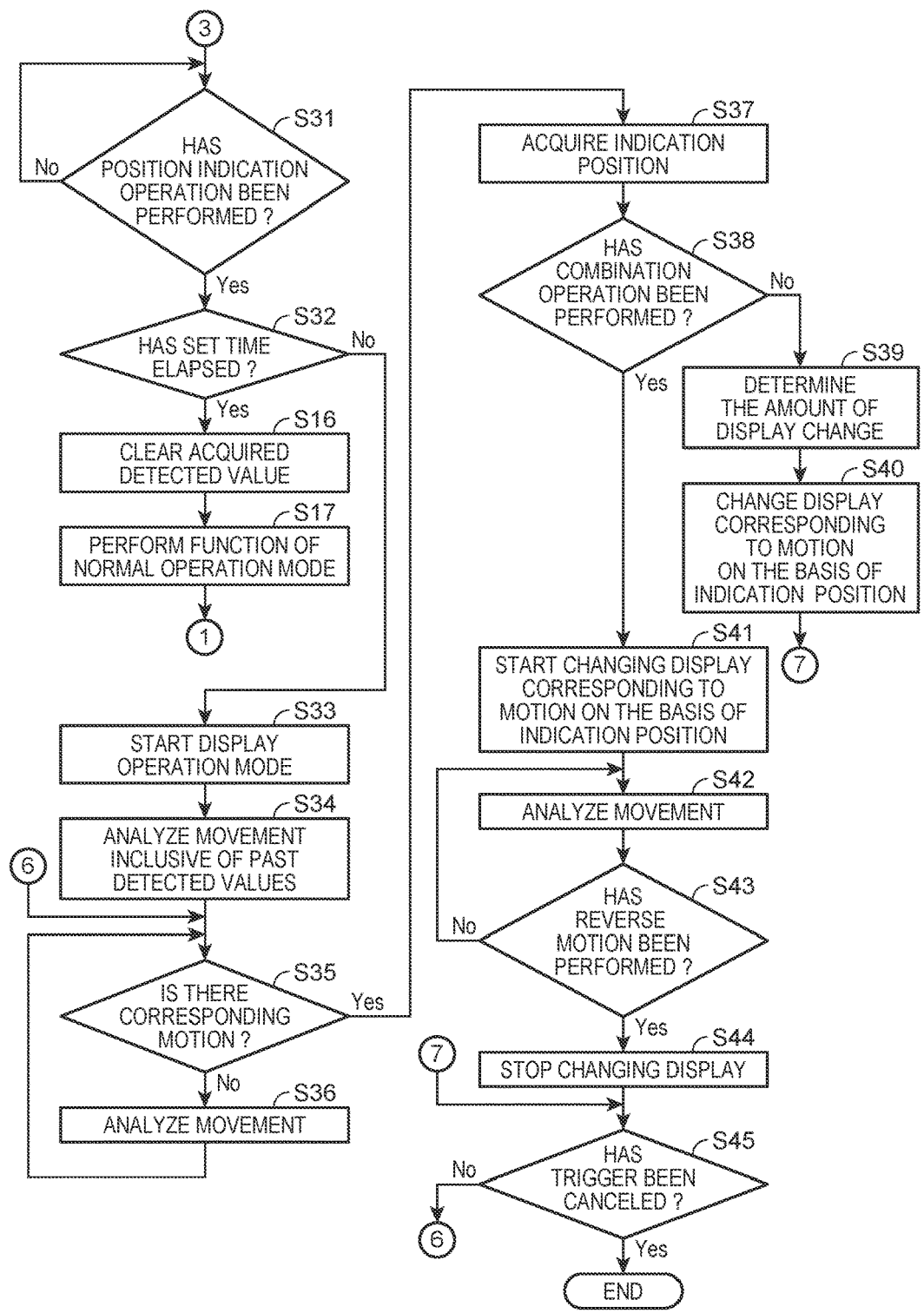
FIG. 12 is a flow chart showing the operation of the HMD.

FIGS. 11 and 12 are flow charts showing the operation of the HMD 100.

When a motion operation of moving the control device 10 is started (step S11), the control unit 150 determines whether to use a position indication (position input) using the track pad 14 (step S12). In a case where a position indication is used, a center position CE is designated in accordance with the operation of the track pad 14 in a process of enlarging display during the execution of a motion A and a process of reducing display during the execution of a motion B. Whether to use a position indication may be designated by a user through an input operation with respect to the operation unit 110, or may be set in advance.

In a case where a position indication is used (step S12; Yes), the control unit 150 proceeds to step S31 (FIG. 12). This case will be described later.

In a case where a position indication is not used (step S12; No), the control unit 150 starts acquiring a detected value of the six-axis sensor 111 (step S13). Thereafter, the control unit 150 acquires a detected value of the six-axis sensor 111 with a cycle which is set in advance.

Subsequently, the control unit 150 determines whether or not an operation serving as a trigger for controlling display is performed (step S14). In a case where an operation is not performed (step S14; No), the control unit stands by until an operation is performed. An operation with respect to various operators such as the buttons 11 provided in the case 10A is an example of the operation serving as a trigger. In the present embodiment, a contact operation with respect to the track pad 14 is set as a trigger.

When the control unit 150 determines that a contact operation with respect to the track pad 14 has been performed (step S14; Yes), the control unit determines whether or not an elapsed time since the start of acquisition of detected values in step S13 has reached a time which is set (set time) (step S15).

A function is allocated in advance to an operator corresponding to an operation serving as a trigger for controlling display. For example, in the present embodiment, a contact operation with respect to the track pad 14 is set as a trigger operation, but a position input operation and a function of a software button corresponding to the display position of the LED display unit 17 are allocated to the track pad 14. The operation detection control unit 152 can change over the detection as a trigger operation or the detection of a position input operation of the track pad 14 or an operation of a software button at a display position of the LED display unit 17 in a case where a contact operation with respect to the track pad 14 is performed. In a case where a time elapsed from the start of acquisition of detected values of the six-axis sensor 111 to the operation of the track pad 14 has reached a set time (step S15; Yes), the operation detection control unit 152 performs a normal operation mode without receiving a motion operation. The operation detection control unit 152 clears the detected values of the six-axis sensor 111 which is acquired in advance and is stored (step S16), and a function allocated as a normal operation is performed on the trigger operation detected in step S14 (step S17), thereby terminating this process.

For example, in a case where a contact at the position of the mark ○ (circle) of the track pad 14 is detected in step S14, the operation detection control unit 152 performs control corresponding to the operation of the home button in step S17.

In a case where the elapsed time has not reached the set time (step S15; No), the operation detection control unit 152 starts a display operation mode (step S18). The display operation mode is an operation mode in which a trigger operation is detected as a trigger of a motion operation. The operation detection control unit 152 analyzes the movement of the case 10A on the basis of the detected values of the six-axis sensor 111 (step S19). The detected values analyzed in step S19 includes the past detected values which are started to be acquired in step S13 and are stored in the memory 118 or the non-volatile storage unit 121, and particularly, includes detected values acquired until an operation serving as a trigger is detected in step S14.

For example, in a case where a user moves the control device 10 while holding the control device in his or her hand and touches the track pad 14 during the movement of the case 10A, the control unit 150 analyzes the movement of the case 10A from before the contact operation with respect to the track pad 14. For example, even when a timing of an operation of moving the control device 10 and a timing of an operation serving as a trigger deviate from each other against the intention of a user, the movement of the case 10A which is performed by the user's intention is analyzed.

The operation detection control unit 152 determines whether or not preset motions (for example, motions A to F) include a motion corresponding to the movement of the case 10A which is analyzed in step S19 (step S20). In a case where there is no corresponding motion (step S20; No), the operation detection control unit 152 analyzes the movement of the case 10A again (step S21), and returns to step S20 to perform determination. In step S21, the analysis is performed inclusive of detected values of the six-axis sensor 111 which are acquired during a period between step S19 and step S21, and thus there is the possibility that a new motion of the case 10A can be detected.

In a case where there is a motion corresponding to the movement of the case 10A (step S20; Yes), the operation detection control unit 152 determines whether to perform a combination operation (step S22). The combination operation refers to an operational method of controlling display by combining a plurality of paired motions. Whether to perform a combination operation may be determined in accordance with an operation performed on the control device 10 or may be set in advance.

In a case where the combination operation is not performed (step S23; No), the display control unit 147 determines contents of display change corresponding to the motion and the amount of display change which are determined by the operation detection control unit 152 in step S20 (step S23). For example, an enlargement ratio and a reduction ratio are determined in response to the motions A and B, and a scrolling direction and the amount of scrolling are determined in response to the motions E and F. The amount of change in display can be set to be a preset amount for each type of motion.

The display control unit 147 changes the display of the image display unit 20 in accordance with the contents of display control and the amount of display change which are determined in step S23 (step S24), and proceeds to step S29 to be described later.

In a case where the combination operation is performed (step S23; Yes), the display control unit 147 starts display change corresponding to the motion determined by the operation detection control unit 152 in step S20 (step S25). After the display change is started, the operation detection control unit 152 analyzes the movement of the case 10A on the basis of detected values of the six-axis sensor 111 (step S26). The operation detection control unit 152 determines whether or not the movement of the case 10A which corresponds to the reverse motion of the motion determined in step S20 has been performed (step S27). While the movement of the reverse motion is not performed (step S27; No), the operation detection control unit performs the analysis of steps S26 and S27 and stands by.

In a case where the operation detection control unit 152 determines that the movement of the reverse motion has been performed (step S27; Yes), the display control unit 147 stops the display change (step S28) and proceeds to step S29.

For example, in a case where the control unit 150 starts upward scrolling in response to the motion E in step S25 and then determines that the motion F has been performed in step S27, the control unit stops the upward scrolling. In this manner, since a timing of the stop of change in display corresponding to a motion can be designated by a reverse motion, a user can freely adjust the amount of change in display.

In step S29, the operation detection control unit 152 determines whether or not the trigger operation has been canceled (step S29). In a case where the trigger operation has not been canceled (step S29; No), this process returns to step S20. In a case where the operation of an operator which is allocated to the trigger operation has been canceled (step S29; Yes), this process is terminated.

On the other hand, in a case where a position indication is used (step S12; Yes), the operation detection control unit 152 determines whether or not a position indication operation using the track pad 14 has been performed (step S31). In a case where the position indication operation has not been performed (step S31; No), the operation detection control unit stands by until the position indication operation is performed. When the operation detection control unit 152 determines that the position indication operation using the track pad 14 has been performed (step S31; Yes), the operation detection control unit determines whether or not an elapsed time of standby of the position indication operation in step S31 has reached a time which is set (set time) (step S32).

In a case where the operation detection control unit 152 determines that the standby time of the position indication operation has reached the set time (step S32; Yes), the operation detection control unit performs a normal operation mode without receiving a motion operation. The operation detection control unit 152 performs the operations of steps S16 and S17 mentioned above, thereby terminating this process.

In a case where the elapsed time has not reached the set time (step S32; No), the operation detection control unit 152 starts a display operation mode (step S33). The operation detection control unit 152 analyzes the movement of the case 10A on the basis of detected values of the six-axis sensor 111 (step S34). In step S33, the operation detection control unit 152 may perform analysis inclusive of the past detected values which have been acquired in advance and are stored in the memory 118 or the non-volatile storage unit 121.

The operation detection control unit 152 determines whether or not preset motions (for example, motions A to F) include a motion corresponding to the movement of the case 10A which is analyzed in step S34 (step S35). In a case where there is no corresponding motion (step S35; No), the operation detection control unit 152 analyzes the movement of the case 10A again (step S36), and returns to step S35 to perform determination.

In a case where there is a motion corresponding to the movement of the case 10A (step S35; Yes), the operation detection control unit 152 acquires coordinates of an indication position of the position indication operation which is detected in step S31 (step S37). Here, the operation detection control unit 152 may obtain display positions of the right display unit 22 and the left display unit 24 which correspond to the acquired indication position.

The operation detection control unit 152 determines whether to perform a combination operation (step S38). The combination operation is as described above. In a case where the combination operation is not performed (step S38; No), the display control unit 147 determines contents of display change corresponding to the motion and the amount of display change which are determined by the operation detection control unit 152 in step S36, similar to step S23 (step S39).

The display control unit 147 changes the display of the image display unit 20 in accordance with the contents of display change and the amount of display change which are determined in step S39, on the basis of the indication position acquired in step S37 by the operation detection control unit 152 (step S40), and proceeds to step S45 to be described later.

In a case where the combination operation is performed (step S38; Yes), the display control unit 147 starts display change corresponding to the motion determined by the operation detection control unit 152 in step S36 (step S41). In step S41, the indication position acquired by the operation detection control unit 152 in step S37 is set to be the standard of display change.

In steps S39 and S41, the display control unit 147 enlarges and reduces display with the indication position as a center position CE, for example, as shown in FIGS. 8A to 8D.

After the display change is started, the operation detection control unit 152 analyzes the movement of the case 10A on the basis of detected values of the six-axis sensor 111 (step S42). The operation detection control unit 152 determines whether or not the movement of the case 10A which corresponds to the reverse motion of the motion determined in step S20 has been performed (step S43). While the movement of the reverse motion is not performed (step S43; No), the operation detection control unit performs the analysis of steps S42 and S43 and stands by.

In a case where the operation detection control unit 152 determines that the movement of the reverse motion has been performed (step S43; Yes), the display control unit 147 stops the display change (step S44) and proceeds to step S45.

In step S45, the operation detection control unit 152 determines whether or not the trigger operation has been canceled (step S45). In a case where the trigger operation has not been canceled (step S45; No), the process returns to step S35. In a case where the operation of an operator which is allocated to the trigger operation has been canceled (step S45; Yes), this process is terminated.

Meanwhile, in a case where the trigger operation has been canceled before it is determined in steps S26 and S27 that the reverse motion has been performed, the display control unit 147 may stop the display change in step S28 similar to a case where the reverse motion has been performed, thereby terminating this process.

Similarly, in a case where the trigger operation has been canceled before it is determined in steps S42 and S43 that the reverse motion has been performed, the display control unit 147 may stop the display change in step S44 similar to a case where the reverse motion has been performed, thereby terminating this process.

Further, in addition to the reverse motion, a specific motion of stopping display change may be set in advance. For example, the movement of the case 10A moving up and down little by little with a smaller amount of operation than the motions E and F may be set as a stop motion serving as a trigger of stopping display change. In this case, in steps S27 and S43, the operation detection control unit 152 may determine that the reverse motion or the stop motion has been performed.

In addition, in step S31 described above, in a case where the operation detection control unit 152 detects the first contact operation with respect to the track pad 14, the operation detection control unit may determine that a position indication operation has been performed, but may fixedly set an indication position in response to a user's instruction. For example, in a case where a contact operation with respect to the track pad 14 has been continuously performed, it is determined that a position indication operation has been performed at a timing which is instructed by a user, and an indication position at the timing may be acquired in step S37. A method of making a user give an instruction of a timing may be, for example, an operation of an operator other than the track pad 14 included in the control device 10. In addition, for example, a timing may be designated by the movement of the image display unit 20. Specifically, the movement of the image display unit 20 moving up and down little by little may be set as a motion of a display unit that designates a timing of a position indication. The movement of the image display unit 20 can be detected and determined by the operation detection control unit 152 on the basis of the detected values of the six-axis sensor 235. In this case, a user can designate a timing by moving his or her head while operating the track pad 14. Accordingly, the user wearing the image display unit 20 on his or her head, particularly, in front of his or her eyes can easily perform an operation of designating any position without viewing the control device 10. In addition, the user may display an image indicating an indication position based on the track pad 14, that is, a contact position, or the like on the image display unit 20 during a period between the start of the user's contact operation with respect to the track pad 14 and the designation of a timing by the movement of the image display unit 20. In this case, the user can adjust an operation position of the track pad 14 while viewing the display of the image display unit 20 and can fixedly set any indication position by the movement of the head, and it is possible to achieve a further improvement in operability.

As described above, the HMD 100 is a head-mounted display device including the image display unit 20 that makes a user visually perceive an image. The HMD 100 includes the control device 10 as an operation device capable of being moved independently of the image display unit 20. The control device 10 includes the six-axis sensor 111 that detects the movement of the control device 10 and the track pad 14 that receives an operation different from the detection of the six-axis sensor 111. The HMD 100 includes the control unit 150 that controls the display of the image display unit 20 in accordance with a movement detected by the six-axis sensor 111 in a state where the track pad 14 receives an operation. Thereby, a user can easily control the display of the image display unit 20 in accordance with an operation of moving the control device 10. In addition, it is possible to prevent a user's unintended change in display by the operation state of the track pad 14.

In addition, the operation detection control unit 152 detects the operation of the track pad 14 on which a contact operation can be performed, as a trigger of a motion operation. In addition, the operation serving as a trigger may be set as an operation of a button capable of being pressed. In any case, it is possible to increase operability in a case where the track pad 14 is operated while moving the case 10A of the control device 10. A contact operation and a pressing operation are operations capable of being performed by a user wearing the image display unit 20 without viewing the track pad 14 and the button. For this reason, a user wearing the head-mounted HMD 100 can easily and reliably perform an operation of changing display even when the user hardly visually perceives the control device 10.

In addition, the control unit 150 changes a display magnification of an image displayed on the image display unit 20 in a case where movements corresponding to an operation of rotating a device by the six-axis sensor 111, for example, the motions A and B are detected. Thereby, it is possible to change the display magnification in accordance with an instinctive operation.

In addition, the control unit 150 changes an image displayed on the image display unit 20 in a direction which is set in advance in a case where movements corresponding to an operation of lifting down a device by the six-axis sensor 111 or an operation of lifting up the device, for example, the motions E, E', F, and F' are detected. Thereby, it is possible to change the image displayed on the image display unit 20 in accordance with an instinctive operation.

In addition, the control unit 150 may change the display of the image display unit 20 in a state where the track pad 14 receives an operation and may then fixedly set a change in the display of the image display unit 20 in a case where the operation of the track pad 14 is canceled. Thereby, it is possible to perform an operation of fixedly setting a change in the display of the image display unit 20. For this reason, it is possible to increase the degree of freedom of a change in display and to achieve an improvement in operability.

In addition, a predetermined function which is performed in a case where the track pad 14 receives an operation is set in the control unit 150. For example, a function of a position input and a function of a software button corresponding to a display position of a mark during the turn-on of the LED display unit 17 are set. The operation detection control unit 152 performs a normal mode and a display operation mode in a changeover manner. The normal mode is an operation mode in which a predetermined function is performed in a case where the track pad 14 receives an operation. The display operation mode is an operation mode in which the display of the image display unit 20 is controlled in accordance with a movement detected by the six-axis sensor 111 in a state where the track pad 14 receives an operation. Thereby, an operator which is set as a trigger can be used as an operation unit that indicates a predetermined function.

For this reason, it is not necessary to provide a dedicated operator used as a trigger of a motion operation in the control device 10, and thus there is an advantage in terms of a reduction in the size of the control device 10.

In addition, the control unit 150 performs the display operation mode in a case where the track pad 14 receives an operation within a set time after the six-axis sensor 111 detects the start of movement. Thereby, it is possible to easily select whether to perform the normal mode or to perform the display operation mode in accordance with the operation of the track pad 14.

In a case where the control unit 150 starts the display operation mode, the control unit reflects a detection history of the six-axis sensor 111 until an operation of the track pad 14 is received after the six-axis sensor 111 detects the start of movement, to thereby control the display of the image display unit 20. Thereby, the movement of the control device 10 until the start of the display operation mode can be reflected on the control of display.

In addition, the control device 10 includes the track pad 14 that receives a position indication operation, and receives an operation of the track pad 14 as a position indication operation.

In addition, the control unit 150 changes the display of the image display unit 20 on the basis of a display position corresponding to a position indicated by the position indication operation received by the track pad 14 in a state where the track pad 14 receives an operation. Thereby, it is possible to control the display of the image display unit 20 with a high level of freedom by using the position indication operation and the movement of the control device 10. In addition, it is possible to perform complicated display control by a simple operation and to achieve an improvement in operability.

In addition, the control unit 150 displays an image displayed on the image display unit 20 in an enlarged or reduced manner, centering on a display position corresponding to a position indicated by the position indication operation received by the track pad 14. Thereby, it is possible to realize control of enlarging or reducing display centering on a user's desired position by a simple operation using the control device 10.

In addition, in the present embodiment, a trigger of a motion operation functions as the track pad 14 on which a position indication operation can be performed. Thereby, operability in a case where the control device 10 is operated without being visually perceived is excellent because of a small number of objects to be operated, and thus it is possible to easily and reliably operate the control device 10 even when a user wearing the head-mounted HMD 100 hardly visually perceives the control device 10. In addition, this is advantageous in a case where the control device 10 is made small.

In addition, the HMD 100 includes the six-axis sensor 235 that detects the movement of the image display unit 20. The control unit 150 specifies an indication position of an operation received by the track pad 14 at a timing when the six-axis sensor 235 detects a predetermined movement. Thereby, an operation of fixedly setting an indication position during a position indication operation can be performed by the movement of the image display unit 20. For this reason, it is possible to further improve operability in a case where a user wearing the head-mounted HMD 100 operates the control device 10.

In addition, the control unit 150 performs a first control of controlling the display of the image display unit 20 in accordance with the type of operation corresponding to movement detected by the six-axis sensor 111 in a state where the track pad 14 receives an operation. The first control relates to, for example, control of changing display in accordance with the motions A to F, and particularly, corresponds to the controls of changing display without being accompanied by a position indication operation in steps S23, S24, S39, and S40. In addition, the control unit performs a second control of changing the display of the image display unit 20 on the basis of a display position corresponding to a position indicated by the position indication operation received by the track pad 14. The second control is equivalent to, for example, an operation of enlarging or reducing display with an indication position of the track pad 14 as a center position CE. In addition, the control unit performs a third control of changing the display of the image display unit 20 in response to a direction of a movement detected by the six-axis sensor 111. The third control is equivalent to upward scrolling, downward scrolling, leftward scrolling, rightward scrolling, the changeover of images based on the display order, and the like. In more detail, the third control is equivalent to the controls using a reverse motion in steps S25 to S28 and S41 to S44. The control unit 150 can perform the first control, the second control, and the third control in a changeover manner.

Thereby, it is possible to change the display of the image display unit 20 in accordance with three controls, in response to the movement of the control device 10.

In addition, the control unit 150 performs control of moving an image displayed on the image display unit 20 in a first display operation direction and a second display operation direction making a pair with the first display operation direction. For example, the upward scrolling and the downward scrolling shown in FIGS. 9A to 9C are equivalent to movements in the first display operation direction and the second display operation direction. In addition, the rightward and leftward scrollings are equivalent to movements in the first display operation direction and the second display operation direction. In addition, regarding the changeover of a plurality of images of which the display order is set, which are shown in FIGS. 10A to 10C, it can be said that the display change of the images being changed over in order and the display change of the images being changed over in reverse order are equivalent to movements in the first display operation direction and the second display operation direction.

The first display operation direction is associated with a first movement direction detected by the six-axis sensor 111, and the second display operation direction is associated with a second movement direction detected by the six-axis sensor 111. The first movement direction and the second movement direction correspond to paired motions among the motions of the case 10A. For example, the motion E is associated with upward scrolling, and the motion F is associated with downward scrolling. Thereby, it is possible to move an image displayed on the image display unit 20 by moving the control device 10 and to indicate a direction of movement of the image in accordance with a movement direction of the control device 10.

In addition, the control unit 150 starts the movement of an image in the first display operation direction in response to the movement in the first movement direction which is detected by the six-axis sensor 111, and then stops the movement of the image in the first display operation direction in a case where the movement thereof in the second movement direction is detected by the six-axis sensor 111. Thereby, it is possible to move the image displayed on the image display unit 20 to a desired position by combining the movements of the control device 10 in the two directions.

Here, a movement detection unit that detects a movement in the first movement direction and/or a movement in the second movement direction may be the magnetic sensor 113 without being limited to the six-axis sensor 111. In addition, it is possible to detect the movement in the first movement direction and/or the movement in the second movement direction by using an image captured by the camera 61. In this case, the camera 61 is equivalent to the movement detection unit. In addition, the movement detection unit may include the function of the control unit 150 that analyzes an image captured by the camera 61 to detect a movement.

In addition, the control unit 150 starts the movement of an image in the first display operation direction or the second display operation direction in response to a movement detected by the six-axis sensor 111, and then stops the movement of the image on the image display unit 20 in a case where an operation received by the track pad 14 is canceled. Thereby, it is possible to move the image displayed on the image display unit 20 to a desired position by combining the movement of the control device 10 and the operation of the track pad 14.

In addition, as described above, the HMD 100 is a head-mounted display device including the image display unit 20 that makes a user visually perceive an image. The HMD 100 includes the control device 10 as an operation device capable of being moved independently of the image display unit 20. The control device 10 includes the six-axis sensor 111 that detects the movement of the control device 10. In addition, the HMD 100 includes the control unit 150 that controls the display of the image display unit 20 in accordance with a movement detected by the six-axis sensor 111. The control unit 150 performs a first display change corresponding to a movement in a first movement direction which is detected by the six-axis sensor 111 and a second display change corresponding to a movement in a second movement direction which is detected by the six-axis sensor 111, as a process performed on an image displayed on the image display unit 20. The control unit starts the first display change in a case where the movement in the first movement direction is detected, and then stops the first display change in a case where the movement in the second movement direction is detected by the six-axis sensor 111. Thereby, it is possible to easily control the display of the image display unit 20 in accordance with an operation of moving the control device 10. In addition, it is possible to move the image displayed on the image display unit 20 to a desired position by combining the movements of the control device 10 in the two directions.

Here, the movement detection unit that detects the movement in the first movement direction and/or the movement in the second movement direction may be the magnetic sensor 113 without being limited to the six-axis sensor 111. In addition, it is possible to detect the movement in the first movement direction and/or the movement in the second movement direction by using an image captured by the camera 61. In this case, the camera 61 is equivalent to the movement detection unit. In addition, the movement detection unit may include the function of the control unit 150 that analyzes an image captured by the camera 61 to detect a movement.

In addition, the control unit 150 performs the first display change in a case where the movement in the first movement direction is detected by the six-axis sensor 111, and performs the second display change in a case where the movement in the second movement direction is detected by the six-axis sensor 111. Thereby, it is possible to move an image displayed on the image display unit 20 by moving the control device 10 and to indicate a direction of movement of the image in accordance with a movement direction of the control device 10.

For example, the control unit 150 can perform upward scrolling as the first display change in a case where the motion E is detected as the movement in the first movement direction, and can perform downward scrolling as the second display change in a case where the motion F is detected as the movement in the second movement direction. In a case where the control unit starts the upward scrolling in response to the detection of the motion E and then detects the motion F as the movement in the second movement direction, the control unit can also stop the upward scrolling.

In addition, the control unit 150 changes the display of the image display unit 20 in accordance with a movement detected by the six-axis sensor 111 in a state where the track pad 14 receives an operation. Thereby, it is possible to prevent a user's unintended change in display by the operation state of the track pad 14.

In addition, the control unit 150 performs the first display change in a case where the movement in the first movement direction is detected by the six-axis sensor 111 in a state where the track pad 14 receives an operation. Thereby, it is possible to prevent a user's unintended change in display by the operation state of the track pad 14.

In addition, the control unit 150 starts the first display change in a case where the movement in the first movement direction is detected by the six-axis sensor 111, and then stops the first display change in a case where the track pad 14 does not receive an operation. Thereby, it is possible to prevent a user's unintended change in display by the operation state of the track pad 14.

In addition, the control unit 150 performs the second display change in a case where the movement in the second movement direction is detected by the six-axis sensor 111 in a state where the track pad 14 receives an operation. Thereby, it is possible to move an image displayed on the image display unit 20 by moving the control device 10 and to indicate a direction of movement of the image in accordance with a movement direction of the control device 10.

In addition, the operation reception unit including the track pad 14 receives an operation which is different from detection performed by the six-axis sensor 111 as a movement detection unit, or the like. For this reason, it is possible to select a state in which display is controlled and a state where display is not controlled, in accordance with an operation which is different from the movement of the control device 10 which is detected by the six-axis sensor or the like. For this reason, it is possible to more reliably prevent a user's unintended change in display.

Here, an operation of the track pad 14 is described as a specific example of an operation which is different from detection performed by the six-axis sensor 111 as a movement detection unit in the above-described embodiment. That is, a configuration in which an operation detection unit is equivalent to the track pad 14 is described. However, the invention is not limited thereto, and the up and down keys 15, the changeover switch 16, the power supply switch 18, or the like may detect an operation which is different from detection performed by the movement detection unit, as an operation detection unit. In a case where the six-axis sensor 111 which is a movement detection unit detects an operation of moving the case 10A, an operation of knocking on the case 10A may be set as the above-mentioned "different operation". In this case, the control device 10 includes a knock sensor and a pressure sensor, and detections of the sensors may be set as operations different from detection performed by the six-axis sensor 111 as a movement detection unit.

In the above-described embodiment, the control device 10 including the case 10A has been described as an example of the operation device according to the invention, but the invention is not limited thereto. For example, the operation device may be an operation device, including a sensor equivalent to a movement detection unit and a functional unit equivalent to an operation reception unit, which is a card type operation device that does not include a housing. In addition, the invention can also be applied to an operation device which is formed integrally with another device. In addition, the operation device can also be referred to as, for example, a remote controller, a control device, a control device, a small-sized device, a motion device, or the like.

In the above-described embodiment, a description has been given of a configuration in which the operation device is connected to the image display unit 20 in a wired manner, but the invention is not limited thereto. The operation device and the image display unit 20 may be configured to be connected to each other in a wireless manner. In this case, a method described as a communication method corresponding to the communication unit 117 may be adopted as a wireless communication method, or another communication method may be used.

In addition, the operation device is not required to have the function of the control device 10. Apart from the control device 10, an apparatus, a device, a unit, or an instrument which is used as an operation device may be provided.

For example, the invention can also be applied by using a wearable device, capable of being attached to a user's body, clothes, or an accessory worn by a user as an operation device, instead of the control device 10. In this case, the wearable device may be, for example, a timepiece type device, a ring type device, a laser pointer, a mouse, an air mouse, a game controller, a pen type device, or the like.

Here, another example of the operation device will be described.

Figure 13:
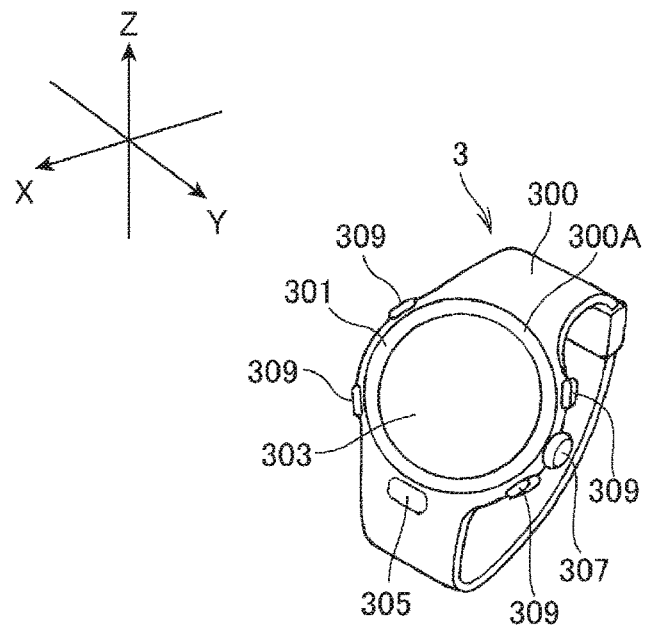
FIG. 13 is a diagram showing the exterior of a timepiece type device.

FIG. 13 is a diagram showing the exterior of a timepiece type device 3. The timepiece type device 3 can be used as another example of the operation device. The timepiece type device 3 is used together with, for example, the control device 10. In this case, the control device 10 may be configured not to function as an operation device.

The timepiece type device 3 includes a band portion 300 having the same shape as a band of a wristwatch. The band portion 300 includes a fixation portion, such as a buckle, which is not shown in the drawing, and can be fixed by being wound around, for example, a user's forearm portion. A substantially disk-shaped plane portion 300A is formed at a position equivalent to a dial of a timepiece in the band portion 300 of the timepiece type device 3. The plane portion 300A is provided with a bezel 301, an LCD 303, a button 305, a winding crown type operator 307, and a plurality of buttons 309.

The bezel 301 is a ring-shaped operator, and is disposed at a peripheral edge of the plane portion 300A. The bezel 301 is provided so as to be rotatable with respect to the band portion 300 in the circumferential direction. The timepiece type device 3 includes a mechanism that detects a rotation direction and the amount of rotation of the bezel 301 as described later. In addition, the mechanism that rotatably supports the bezel 301 against the band portion 300 may include a storage that generates a notch sound in accordance with rotation.

The LCD 303 is a liquid crystal display that displays characters or an image.

The button 305 is a push button type switch which is disposed on the outer side of the bezel 301. The button 305 is positioned below the bezel 301 when seen from a user, in a wearing state of the timepiece type device 3. The button 305 has a size larger than those of the winding crown type operator 307 and the button 309, and can also be operated by touch.

The winding crown type operator 307 is an operator having a dragonhead shape of a wristwatch, and can be rotated as indicated by an arrow in the drawing. The timepiece type device 3 includes a mechanism that detects a rotation direction and the amount of rotation of the winding crown type operator 307 in a case where a user rotates the winding crown type operator 307. In addition, a mechanism that rotatably supports the winding crown type operator 307 against the band portion 300 may include a storage that generates a notch sound in accordance with rotation.

The button 309 is a push button type switch which is provided at the outer peripheral portion of the plane portion 300A. The number of buttons 309 is not particularly limited, and an example in which four buttons 309 are provided is described in the present embodiment.

Different functions can be allocated to the buttons 309, and the functions allocated to the respective buttons 309 can be displayed on the LCD 303.

The timepiece type device 3 can use the bezel 301, the button 305, the winding crown type operator 307, and the buttons 309 as operation reception units. These operation reception units are allocated to a function of giving an instruction for the execution and/or cancellation of a mute function of temporarily stopping the display of the image display unit 20 or a function of giving an instruction for the change of a type of pointer displayed on the image display unit 20, for example, during a normal operation.

In addition, the timepiece type device 3 has a communication unit and a motion sensor built therein. The communication unit, not shown in the drawing, functions similarly to the communication unit 117, and the motion sensor, not shown in the drawing, functions similarly to the six-axis sensor 111. The timepiece type device 3 detects an operation with respect to each unit functioning as an operation reception unit, and transmits a detection result to the control device 10 in a wireless manner. In addition, the timepiece type device 3 transmits a detection result of the motion sensor to the control device 10 in a wireless manner.

In such a configuration, the control device 10 can detect an operation of moving the timepiece type device 3 like, for example, the above-mentioned motions A to F, C', D', E', and F'. In addition, the control device 10 detects operations of the bezel 301, the button 305, the winding crown type operator 307, and the buttons 309 as operations different from detection performed by the motion sensor. In this case, it is possible to control the display of the image display unit 20 in accordance with an operation of moving the timepiece type device 3 while operating the bezel 301, the button 305, the winding crown type operator 307, and the buttons 309. A movement direction of the timepiece type device 3 and the control of display of the image display unit 20 can be performed, for example, in the same manner as those in the above-described embodiment.

Figure 14:
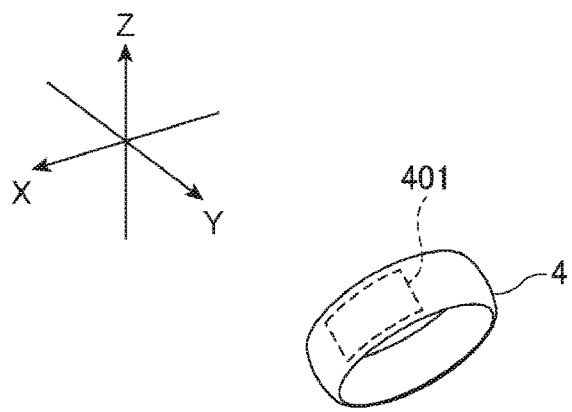
FIG. 14 is a diagram showing the exterior of a ring type device.

FIG. 14 is a diagram showing the exterior of a ring type device 4. The ring type device 4 has the same shape as a ring, and is put on, for example, a user's finger. A track pad 401 capable of detecting a contact operation, similar to the track pad 14, is installed on the surface of the ring type device 4.

The ring type device 4 detects a contact on the track pad 401 by a detection circuit not shown in the drawing. In such a configuration, the track pad 401 functions as an operation detection unit. The track pad 401 is allocated to a function of giving an instruction for the execution and/or cancellation of a mute function of temporarily stopping the display of the image display unit 20 or a function of giving an instruction for the change of a type of pointer displayed on the image display unit 20, for example, during a normal operation.

In addition, the ring type device 4 has a communication unit and a motion sensor built therein. The communication unit, not shown in the drawing, functions similarly to the communication unit 117, and the motion sensor, not shown in the drawing, functions similarly to the six-axis sensor 111. The ring type device 4 detects an operation with respect to each unit functioning as an operation reception unit, and transmits a detection result to the control device 10 in a wireless manner. In addition, the ring type device 4 transmits a detection result of the motion sensor to the control device 10 in a wireless manner.

In such a configuration, the control device 10 can detect an operation of moving the ring type device 4 like, for example, the above-mentioned motions A to F, C', D', E', and F'. In addition, the control device 10 detects an operation of the track pad 401 as an operation which is different from detection performed by the motion sensor. In this case, it is possible to control the display of the image display unit 20 in accordance with an operation of moving the ring type device 4 while operating the track pad 401. A movement direction of the ring type device 4 and the control of display of the image display unit 20 can be performed, for example, in the same manner as those in the above-described embodiment.

In a case where a wearable device worn on a user's body, like the timepiece type device 3 and the ring type device 4, is used as an operation device, it is possible to easily control display in accordance with an operation of moving the user's body. In addition, the control of display based on a detected value of the motion sensor is performed by detecting an operation different from detection performed by the motion sensor, and thus it is possible to prevent a user's unintended change in display. For this reason, an instinctive operation is realized, and it is possible to prevent an erroneous operation and to control a user's intended display.

A direction of movement of the timepiece type device 3 and the ring type device 4 can be detected and specified on the basis of, for example, the X-axis direction, the Y-axis direction, and the Z-axis direction shown in the drawing. A motion of moving the timepiece type device 3 and the ring type device 4 in a specific direction is equivalent to an operation in a first movement direction and an operation in a second movement direction, similar to the above-mentioned motions A to F, C', D', E', and F'. In addition, the operation in the first movement direction and the operation in the second movement direction are set as movements in a specific direction, but a movement close to the specific direction may be regarded as a movement in the specific direction. A range in which motions are regarded as motions in the same direction may be arbitrarily set, and may be set to, for example, ±5 degrees or ±10 degrees. The same is true of the first movement direction and the second movement direction. In addition, a standard of a direction of each of the movement of the timepiece type device 3 and the ring type device 4 may be set in advance in association with a detection direction of the motion sensor which is built into each of the timepiece type device 3 and the ring type device 4. Therefore, the direction of movement can be set on the basis of any direction, and is not limited to the X-axis direction, the Y-axis direction, and the Z-axis direction shown in the drawing.

In addition, the timepiece type device 3 and the ring type device 4 are not limited to being used together with the control device 10. The HMD 100 may have a function equivalent to the control device 10 and may be configured to be capable of controlling the display of the image display unit 20. Accordingly, when a configuration in which units including the main processor 140 can be accommodated in the image display unit 20 is adopted, the HMD 100 can be constituted by, for example, the image display unit 20 and the timepiece type device 3 or the image display unit 20 and the ring type device 4.

Meanwhile, the invention is not limited to the configuration of the above-described embodiment, and can be implemented in various aspects without departing from the scope of the invention.

For example, in the above-described embodiment, a configuration in which a user visually perceives an outside scene through a display unit is not limited to a configuration in which the right light guiding plate 26 and the left light guiding plate 28 transmit external light. For example, the invention can also be applied to a display device capable of displaying an image in a state where an outside scene cannot be visually perceived. Specifically, the invention can be applied to a display device that displays an image captured by the camera 61, an image or CG which is generated on the basis of the captured image, a video based on video data stored in advance or video data which is input from the outside, or the like. Such types of display devices may include a so-called closed display device by which an outside scene cannot be visually perceived. In addition, the invention can also be applied to a display device that does not perform processing such as AR display in which an image is displayed so as to overlap a real space as described in the above-described embodiment, mixed reality (MR) display in which a captured image of a real space and a virtual image are combined with each other, or virtual reality (VR) display in which a virtual image is displayed. For example, a display device that displays video data or an analog video signal which is input from the outside can also be, of course, included in objects to which the invention is applied.

In the above-described embodiment, enlargement, reduction, scrolling, and changeover of an image based on the display order have been described as examples in which a display mode of an image displayed on the image display unit 20 is changed, but the invention is not limited thereto. For example, control of rotating an image, control of changing display luminance of an image, control of increasing or reducing the display size of a portion of an image being displayed or characters, and the like may be performed in response to a motion. In this case, a rotation direction of the image, a change direction (an increase or decrease in luminance) of the display luminance of the image, and the increase or reduction in size may be associated with different motions. In addition, the operation of a trigger for starting an operation based on a motion is not limited to being performed using the track pad 14 or an operator such as the button included in the control device 10, and may be detected by a method different from the movement of the case 10A. Specifically, since the operation may be able to be detected based on a detected value different from a detected value of the six-axis sensor 111, for example, the movement of the image display unit 20 which is detected by the six-axis sensor 235 may be set as a trigger operation. In addition, for example, a touch sensor (not shown) is provided in the image display unit 20, and an operation with respect to the touch sensor may be set as a trigger operation.

In addition, for example, another type of image display unit such as an image display unit worn like, for example, a cap may be adopted instead of the image display unit 20, and the image display unit may include a display unit displaying an image corresponding to a user's left eye and a display unit displaying an image corresponding to the user's right eye. In addition, the display device according to the invention may be configured as a head-mounted display which is mounted on a vehicle such as an automobile or an airplane. In addition, the display device may be configured as a head-mounted display which is built into a body protection tool such as a helmet. In this case, a portion positioning a position with respect to a user's body and a portion positioned with respect to the portion can be set to be a mounting portion.

Further, in the above-described embodiment, a description has been given of an example of a configuration in which the image display unit 20 and the control device 10 are separated from each other and are connected to each other through the connection cable 40, but the control device 10 and the image display unit 20 can be integrally formed and can also be configured to be worn on a user's head.

In addition, a notebook computer, a tablet computer, or a desktop computer may be used as the control device 10. In addition, a portable electronic device including a game machine, a mobile phone, a smart phone, and a portable media player, other dedicated devices, and the like are used as the control device 10. In addition, a configuration may also be adopted in which the control device 10 is configured so as to be separated from the image display unit 20, and various signals are transmitted and received between the control device 10 and the image display unit 20 through wireless communication.

In the above-described embodiment, a description has been given of an example of a configuration in which the image display unit 20 and the control device 10 are separated from each other and are connected to each other through the connection cable 40, but a configuration may also be adopted in which the control device 10 and the image display unit 20 are connected to each other through a wireless communication line.

In addition, a description has been given of a configuration in which a virtual image is formed in a portion of each of the right light guiding plate 26 and the left light guiding plate 28 by the half mirrors 261 and 281, as an optical system that guides image light to a user's eyes. The invention is not limited thereto, and a configuration may also be adopted in which an image is displayed in a display region having an area that occupies the entirety or majority of the right light guiding plate 26 and the left light guiding plate 28. In this case, in an operation of changing a display position of an image, a process of reducing the size of the image may be included.

Further, the optical element according to the invention is not limited to the right light guiding plate 26 and the left light guiding plate 28 which respectively include the half mirrors 261 and 281, and may be an optical component that makes image light incident on a user's eyes. Specifically, a diffraction grating, a prism, or a holographic display unit may be used.

In addition, at least a portion of functional blocks shown in FIGS. 4 and 5 may be realized by hardware or may be realized by cooperation of hardware and software, and the invention is not limited to a configuration in which an independent hardware resource is disposed as shown in the drawing. In addition, a program executed by the control unit 150 may be stored in another storage device (not shown) within the non-volatile storage unit 121 or the control device 10. In addition, a configuration may also be adopted in which a program stored in an external device is acquired and executed through the communication unit 117 and the external connector 184. In addition, among the components formed in the control device 10, the operation unit 110 may be formed as a user interface (UI). In addition, the components formed in the control device 10 may also be formed in the image display unit 20. For example, the same processor as the main processor 140 may be disposed in the image display unit 20, and the main processor 140 included in the control device 10 and the processor of the image display unit 20 may be configured to perform separate functions.

The entire disclosure of Japanese Patent Application Nos. 2016-026989, filed Feb. 16, 2016 and 2016-026990, filed Feb. 16, 2016 are expressly incorporated by reference herein.

What is claimed is:

1. A head-mounted display device including a display that makes a user visually perceive an image, the head-mounted display device comprising:
   an operation device, capable of being moved independently of the display, which includes a sensor detecting a movement of the operation device and an input device receiving an operation different from the detection of the sensor; and
   a processor programmed to:
      control displaying of the display in accordance with the movement detected by the sensor when the input device receives an operation; and
      detect the operation received by the input device within a set time after the sensor detects start of a movement as a trigger for controlling the display based on the movement of the operation device.

2. The display device according to claim 1, wherein the input device receives at least any one of a pressing operation and a contact operation.

3. The display device according to claim 1, wherein the processor is further programmed to change a display magnification of an image displayed on the display when a movement corresponding to an operation of rotating the operation device is detected by the sensor.

4. The display device according to claim 1, wherein the processor is further programmed to change an image displayed on the display in a direction which is set in advance, when a movement corresponding to an operation of lifting down the operation device or an operation of lifting up the operation device is detected by the sensor.

5. The display device according to claim 1, wherein the processor is further programmed to change display of the display in a state where the input device receives an operation, and then fixedly sets a change in the display of the display when the operation is canceled.

6. The display device according to claim 1, wherein the processor is further programmed to perform a predetermined function when the input device receives an operation, and perform a normal mode in which the predetermined function is performed when the input device receives an operation and a display operation mode in which the display of the display is controlled in accordance with the movement detected by the sensor in a state where the input device receives an operation, in a changeover manner.

7. The display device according to claim 6, wherein when execution of performing the display operation mode has started, the processor is further programmed to reflect a detection history detected by the sensor during a period between when the sensor detects start of a movement and when the input device receives an operation, to thereby control display of the display.

8. The display device according to claim 1, wherein the operation device includes a second processor that is programmed to receive a position indication operation.

9. The display device according to claim 8, wherein the processor is further programmed to change display of the display on the basis of a display position corresponding to a position which is indicated by a position indication operation received by the second processor in a state where the position indication operation is received by the second processor and the input device receives an operation.

10. The display device according to claim 9, wherein the processor is further programmed to display an image displayed on the display in an enlarged or reduced manner, centering on the display position corresponding to the position which is indicated by the position indication operation received by the second processor.

11. The display device according to claim 8, wherein the second processor functions as the input device.

12. The display device according to claim 9, further comprising:
a display sensor that detects a movement of the display, wherein the processor is further programmed to specify an indication position of an operation received by the second processor at a timing when the display sensor detects a predetermined movement.

13. The display device according to claim 1, wherein the processor is further programmed to perform control of moving an image displayed on the display in a first display operation direction and a second display operation direction paired with the first display operation direction, and
wherein the first display operation direction is associated with a first movement direction detected by the sensor, and the second display operation direction is associated with a second movement direction detected by the sensor.

14. The display device according to claim 1, wherein the operation device is a wearable device which is worn on the user's body.

15. A head-mounted display device including a display that makes a user visually perceive an image, the head-mounted display device comprising:
an operation device, capable of being moved independently of the display, which includes a sensor detecting a movement of the operation device,
wherein the operation device includes an input device that receives an operation; and
a processor programmed to:
control displaying of the display in accordance with the movement detected by the sensor;
perform a first display change corresponding to a movement in a first movement direction which is detected by the sensor and a second display change corresponding to a movement in a second movement direction which is detected by the sensor, as a process performed on an image displayed on the display;
start the first display change when the movement in the first movement direction is detected, and then stops the first display change when the movement in the second movement direction is detected by the sensor; and
detect the operation received by the input device within a set time after the sensor detects start of a movement as a trigger for controlling the display based on the movement of the operation device.

16. The display device according to claim 15, wherein the processor is further programmed to perform the first display change when the movement in the first movement direction is detected by the sensor, and performs the second display change when the movement in the second movement direction is detected by the sensor.

17. The display device according to claim 15, wherein the processor is further programmed to change display of the display in accordance with the movement detected by the sensor in a state where the input device receives an operation.

18. The display device according to claim 15, wherein the operation device is a wearable device which is worn on the user's body.

19. A method of controlling a head-mounted display device including a display that makes a user visually perceive an image, the method comprising:
moving an operation device independently of the display, the operation device including a sensor and an input device;
detecting, by the sensor, a movement of the operation device;
receiving an operation by the input device;
controlling display of the display in accordance with the movement detected by the sensor when the input device receives an operation; and
detecting the operation received by the input device within a set time after the sensor detects start of a movement as a trigger for controlling the display based on the movement of the operation device.

20. A method of controlling a head-mounted display device including a display that makes a user visually perceive an image, the method comprising:
moving an operation device independently of the display, the operation device including a sensor and an input device that receives an operation;
detecting, by the sensor, a movement of the operation device;
performing a first display change corresponding to a movement in a first movement direction which is detected by the sensor and a second display change corresponding to a movement in a second movement direction which is detected by the sensor, as a process performed on an image displayed on the display;
starting the first display change when the movement in the first movement direction is detected, and then stopping the first display change when the movement in the second movement direction is detected by the sensor; and
detecting the operation received by the input device within a set time after the sensor detects start of a movement as a trigger for controlling the display based on the movement of the operation device.

\* \* \* \* \*